US011240009B2

(12) United States Patent
Saxena et al.

(10) Patent No.: US 11,240,009 B2
(45) Date of Patent: *Feb. 1, 2022

(54) SYSTEMS AND METHODS FOR ESTABLISHING A LINK BETWEEN IDENTIFIERS WITHOUT DISCLOSING SPECIFIC IDENTIFYING INFORMATION

(71) Applicant: Google LLC, Mountain View, CA (US)

(72) Inventors: Shobhit Saxena, San Francisco, CA (US); Benjamin Kreuter, Jersey City, NJ (US); Sarvar Patel, Montville, NJ (US); Karn Seth, Jackson Heights, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,610

(22) Filed: Aug. 25, 2020

(65) Prior Publication Data

US 2020/0389298 A1 Dec. 10, 2020

Related U.S. Application Data

(63) Continuation of application No. 15/842,524, filed on Dec. 14, 2017, now Pat. No. 10,764,041.

(Continued)

(51) Int. Cl.
*H04L 9/08* (2006.01)
*H04L 29/06* (2006.01)
(Continued)

(52) U.S. Cl.
CPC .............. *H04L 9/0838* (2013.01); *G06F 9/44* (2013.01); *G06F 21/6254* (2013.01);
(Continued)

(58) Field of Classification Search
CPC ....... H04L 9/08; H04L 9/0838; H04L 9/3013; H04L 9/30; H04L 9/0866; H04L 9/0844;
(Continued)

(56) References Cited

U.S. PATENT DOCUMENTS

| 9,641,332 B1 | 5/2017 | Yung et al. |
| 2008/0137840 A1* | 6/2008 | Vanden Berghe .... H04L 9/3242 380/28 |

(Continued)

FOREIGN PATENT DOCUMENTS

| JP | 2013-114622 A | 6/2013 |
| JP | 2014-096692 A | 5/2014 |

(Continued)

OTHER PUBLICATIONS

Examination Report for IN Appln. Ser. No. 201927016061 dated Nov. 11, 2020 (5 pages).

(Continued)

*Primary Examiner* — Kristine L Kincaid
*Assistant Examiner* — Shaqueal D Wade-Wright
(74) *Attorney, Agent, or Firm* — Dority & Manning, P.A.

(57) ABSTRACT

Systems and methods may be used for establishing a link between user identifiers of different systems without disclosing specific user identifying information. One method includes generating a matching relationship based on double encrypted one or more first data sets of a first party system and double encrypted one or more second data sets of a second party system. The matching relationship indicates one or more links between match keys associated with the first party system and the match keys associated with the third party system. The method includes assigning bridge identifiers for user identifiers associated with the first party system and the user identifiers associated with the third party system based on the matching relationship.

20 Claims, 12 Drawing Sheets

Related U.S. Application Data

(60) Provisional application No. 62/466,797, filed on Mar. 3, 2017.

(51) Int. Cl.
    *G06F 21/62*       (2013.01)
    *G06F 9/44*        (2018.01)
    *H04L 9/00*        (2006.01)
    *H04L 9/32*        (2006.01)
    *H04L 9/30*        (2006.01)

(52) U.S. Cl.
    CPC ............. *H04L 9/008* (2013.01); *H04L 9/083* (2013.01); *H04L 9/0844* (2013.01); *H04L 9/32* (2013.01); *H04L 63/06* (2013.01); *H04L 9/30* (2013.01); *H04L 9/3013* (2013.01); *H04L 9/3066* (2013.01)

(58) Field of Classification Search
    CPC ......... H04L 9/008; H04L 9/06; H04L 9/0678; H04L 9/083; H04L 9/32; H04L 63/06; H04L 63/061; G06F 21/6254; G06F 21/62
    See application file for complete search history.

(56) References Cited

U.S. PATENT DOCUMENTS

| | | | |
|---|---|---|---|
| 2011/0060905 A1* | 3/2011 | Stack .................... | G06Q 30/02 713/167 |
| 2012/0311035 A1 | 12/2012 | Guha et al. | |
| 2013/0290700 A1 | 10/2013 | Davis et al. | |
| 2015/0288665 A1* | 10/2015 | El Emam ................ | G06F 16/86 713/171 |
| 2016/0078431 A1 | 3/2016 | Ramachandran et al. | |
| 2017/0026345 A1 | 1/2017 | Salek et al. | |
| 2018/0227278 A1 | 8/2018 | Camenisch et al. | |

FOREIGN PATENT DOCUMENTS

| | | |
|---|---|---|
| JP | 2014-098753 A | 5/2014 |
| KR | 1020160145692 A | 12/2016 |
| WO | WO-2017/019376 A1 | 2/2017 |

OTHER PUBLICATIONS

First Office Action for CN Appln. Ser. No. 201780014769.0 dated Oct. 12, 2020 (7 pages).

Agrawal et al., "Information Sharing Across Private Databases", Proceedings of the 2003 ACM SIGMOD International Conference on Management of Data, Jun. 9-12, 2003 (12 pages).

Examination Report for EP Appln. Ser. No. 17826081.6 dated Aug. 1, 2019 (7 pages).

Examination Report for EP Appln. Ser. No. 17826081.6 dated Dec. 6, 2019 (6 pages).

International Preliminary Report on Patentability for PCT Appln. Ser. No. PCT/US2017/066515 dated Sep. 12, 2019 (8 pages).

International Search Report and Written Opinion for PCT Appln. Ser. No. PCT/US2017/066515 dated Feb. 12, 2018 (15 pages).

Loftus et al., "On CCA-Secure Somewhat Homomorphic Encryption", International Workshop on Selected Areas in Cryptography, Springer, Berlin, Heidelberg, 2011, pp. 55-72 (18 pages).

Notice of Allowance for JP Appln. Ser. No. 2018-545907 dated Sep. 25, 2019 (5 pages).

Notice of Allowance for U.S. Appl. No. 15/842,524 dated Apr. 29, 2020 (11 pages).

Notice of Allowance for U.S. Appl. No. 15/842,524 dated Jan. 24, 2020 (9 pages).

Office Action for KR Appln. Ser. No. 10-2018-7025342 dated Jan. 28, 2020 (17 pages).

Wang et al., "A Recommendation-based Matchmaking Scheme for Multiple Mobile Social Networks against Private Data Leakage", Procedia Computer Science, vol. 17, 2013, pp. 781-788 (8 pages).

\* cited by examiner

SYSTEMS AND METHODS FOR ESTABLISHING A LINK BETWEEN IDENTIFIERS WITHOUT DISCLOSING SPECIFIC IDENTIFYING INFORMATION

CROSS-REFERENCE TO RELATED PATENT APPLICATIONS

This application claims the benefit of and priority as a continuation to U.S. patent application Ser. No. 15/842,524, filed Dec. 14, 2017, which claims the benefit of and priority to U.S. Provisional Patent Application No. 62/466,797, filed Mar. 3, 2017, the entire disclosure of each of which is incorporated by reference herein.

BACKGROUND

Web data may include user identifiable information that businesses store in protected databases. Businesses that manage systems that store user identifiable information may desire to establish a link between the identifiers of two parties without disclosing specific user identifying information.

SUMMARY

One illustrative method is a method for establishing a link between user identifiers of different systems without disclosing specific user identifying information. The method includes encrypting, by a first party system, one or more first data sets each including a match key and a user identifier associated with the first party system and sending, by the first party system, the encrypted one or more first data sets to a third party system. The method includes receiving, by the first party system from the third party system, one or more encrypted second data sets each including a match key and a user identifier associated with the third party system and receiving, by the first party system from the third party system, one or more double encrypted first data sets, the one or more double encrypted first data sets including the encrypted one or more first data sets further encrypted by the third party system. The method further includes encrypting, by the first party system, the encrypted one or more second data sets received from the third party system to generate one or more double encrypted second data set. The method includes generating, by the first party system, a matching relationship based on the double encrypted one or more first data sets and the double encrypted one or more second data sets, the matching relationship indicating one or more links between the match keys associated with the first party system and the match keys associated with the third party system and assigning, by the first party system, bridge identifiers for the user identifiers associated with the first party system and the user identifiers associated with the third party system based on the matching relationship, the bridge identifier being a link between the user identifiers associated with the first party system and the user identifiers associated with the third party system.

In some implementations, the method includes selecting, by the third party system, the user identifiers associated with the third party system for the one or more second data sets to be random points on an elliptic curve and encrypting, by the third party system, the one or more second data sets by exponentiating the selected user identifiers associated with the third party system of the one or more second data sets with a third party deterministic exponent.

In some implementations, the method includes pruning, by the first party system, the matching relationship by removing links from the matching relationship so that each match key associated with the third party system has one link to the match keys of the first party system and each match key associated with the first party system has one link to the match keys of the third party system.

In some implementations, the method includes pruning, by the first party system, the matching relationship by removing one or more of the links between the match keys by determining match keys of the third party system that have more than one link. In some implementations, removing the links of the matching relationship causes some of the user identifiers of the first and third party system to be matched and some of the user identifiers of the first and third party system to not be matched. In some implementations, assigning, by the first party system, bridge identifiers for the user identifiers associated with the first party system and the user identifiers associated with the third party system based on the matching relationship includes assigning both the matched and the unmatched user identifiers of the first party system and the third party system the bridge identifiers.

In some implementations, the method includes exponentiating, by the first party system, one or more first tuples with a first exponent, each first tuple linking the user identifiers associated with the first party system to the bridge identifiers. In some implementations, the method includes sending, by the first party system to the third party system, the one or more exponentiated first tuples. Furthermore the method includes sending, by the first party system to the third party system, one or more second tuples, each second tuple linking one of the user identifiers associated with the third party system to one of the bridge identifiers. In some implementations, the method includes generating, by the third party system, a bridge identifier map by exponentiating the bridge identifiers of the one or more second tuples with a second exponent, exponentiating, by the third party system, the one or more exponentiated first tuples with the second exponent, and sending, by the third party system to the first party system, the one or more exponentiated first tuples. The method may further include generating, by the first party system, a bridge identifier map for the first party system by removing the first exponent from the one or more exponentiated first tuples.

In some implementations, the method includes encrypting, by the first party system, the first data set by encrypting the user identifiers associated with the first party system with an El-Gamal key and encrypting the match keys associated with the first party system with a first party deterministic key. In some implementations, the method includes encrypting, by the third party system, the one or more first data sets to generate one or more double encrypted first data sets by encrypting the encrypted match keys associated with the first party system with a third party deterministic encryption key and raising the encrypted user identifiers encrypted with the El-Gamal key to an exponent.

In some implementations, the method includes sending, by the first party system to the third party system, a first party El-Gamal key, the first party El-Gamal key is a public key of the first party system and receiving, by the first party system from the third party system, a third party El-Gamal key, the third party El-Gamal key is a public key of the third party system. In some implementations, the method includes encrypting, by the first party system, the one or more first data sets include encrypting, by the first party system, the one or more first data sets with the first party El-Gamal key and a first party deterministic key. In some implementations, the method further includes encrypting, by the third party system, the encrypted one or more first data sets with a third party deterministic key to generate one or more double encrypted first data sets and encrypting, by the third party system, the encrypted one or more second data sets by encrypting the match keys associated with the third party system with the third party deterministic key.

In some implementations, the method includes encrypting, by the first party system, each of the assigned bridge identifiers with the first party El-Gamal key and the second party El-Gamal key, sending, by the first party system to the third party system, one or more first tuples including the encrypted bridge identifiers and associated user identifiers associated with the first party system, and sending, by the first party system to the third party system, one or more second tuples including the encrypted bridge identifiers and associated user identifiers associated with the third party system.

In some implementations, the method includes generating, by the third party system, a bridge identifier map for the third party system by decrypting the one or more second tuples with the third party El-Gamal key, de-exponentiating, by the third party system, the one or more first tuples and send the de-exponentiated one or more first tuples to the first party system, and generating, by the first party system, a bridge identifier map for the first party system by decrypting the one or more first tuples with the first party El-Gamal key.

Another implementation of the present disclosure is a first party system for establishing a link between user identifiers of different systems without disclosing specific user identifying information, the first party system including a processing circuit operably coupled to a memory. The processing circuit is configured to encrypt one or more first data sets each including a match key and a user identifier associated with the first party system, send the encrypted one or more first data sets to a third party system, receive, from the third party system, one or more encrypted second data sets each including a match key and a user identifier associated with the third party system, and receive, from the third party system, one or more double encrypted first data sets, the one or more double encrypted first data sets are the encrypted one or more first data sets encrypted by the third party system. The processing circuit is configured to encrypt the encrypted one or more second data sets received from the third party system to generate one or more double encrypted second data sets, generate a matching relationship based on the double encrypted one or more first data sets and the double encrypted one or more second data sets, the matching relationship indicating one or more links between the match keys associated with the first party system and the match keys associated with the third party system, and assign bridge identifiers for the user identifiers associated with the first party system and the user identifiers associated with the third party system based on the matching relationship, the bridge identifier being a link between the user identifiers associated with the first party system and the user identifiers associated with the third party system.

In some implementations, the processing circuit is configured to prune the matching relationship by removing links from the matching relationship so that each match key associated with the third party system has one link to the match keys of the first party system and each match key associated with the first party system has one link to the match keys of the third party system.

In some implementations, the processing circuit is configured to prune the matching relationship by removing one or more of the links between the match keys by determining match keys of the third party system that have more than one link.

In some implementations, the processing circuit is configured to exponentiate one or more first tuples with a first exponent, each first tuple linking the user identifiers associated with the first party system to the bridge identifiers and send, to the third party system, the one or more exponentiated first tuples. In some implementations, the processing circuit is configured to send, to the third party system, one or more second tuples, each second tuple linking one of the user identifiers associated with the third party system to one of the bridge identifiers. The third party system can generate bridge identifier map by exponentiating the bridge identifiers of the one or more second tuples with a second exponent. The processing circuit can be configured to receive, from the third party system, the one or more exponentiated tuples exponentiated with the second exponent and generate a bridge identifier map for the first party system by removing the first exponent from the one or more exponentiated first tuples.

Another illustrative method is a method for establishing a link between user identifiers of different systems without disclosing specific user identifying information. The method includes encrypting, by a first party processing circuit, one or more first data sets each including a match key and a user identifier associated with the first party system, sending, by the first party processing, the encrypted one or more first data sets to a third party processing circuit, and receiving, by the first party processing circuit from the third party processing circuit, one or more encrypted second sets each including a key and a user identifier associated with the third party processing circuit. The method includes receiving, by the first party processing circuit from the third party processing circuit, one or more double encrypted first data sets, the one or more double encrypted first data sets are the encrypted one or more first data sets encrypted by the third party processing circuit, encrypting, by the first party processing circuit, the encrypted one or more second data sets received from the third party processing circuit to generate one or more double encrypted second data sets, and generating, by the first party processing circuit, a matching relationship based on the double encrypted one or more first data sets and the double encrypted one or more second data sets, the matching relationship indicating one or more links between the match keys associated with the first party processing circuit and the match keys associated with the third party processing circuit. Further, the method includes pruning, by the first party processing circuit, the matching relationship by removing one or more of the links between the match keys by determining match keys of the third party processing circuit that have more than one link and assigning, by the first party processing circuit, bridge identifiers for the user identifiers associated with the first party processing circuit and the user identifiers associated with the third party processing circuit based on the pruned matching relationship, the bridge identifier being a link between the user identifiers associated with the first party processing circuit and the user identifiers associated with the third party processing circuit, the bridge identifier being a link between the user identifiers associated with the first party system and the user identifiers associated with the third party system.

In some implementations, the method includes selecting, by the third party processing circuit, the user identifiers associated with the third party processing circuit for the one or more second data sets to be random points on an elliptic curve and encrypting, by the third party processing circuit, the one or more second data sets by exponentiating the selected user identifiers associated with the third party processing circuit of the one or more second data sets with a third party deterministic exponent.

In some implementations, the method includes pruning, by the first party processing circuit, the matching relationship includes removing links from the matching relationship so that each match key associated with the third party processing circuit has one link to the match keys of the first party processing circuit and each match key associated with the first party processing circuit has one link to the match keys of the third party processing circuit.

In some implementations, the method includes exponentiating, by the first party processing circuit, one or more first tuples with a first exponent, each first tuple linking the user identifiers associated with the first party processing circuit to the bridge identifiers, sending, by the first party processing circuit to the third party processing circuit, the one or more exponentiated first tuples, and sending, by the first party processing circuit to the third party processing circuit, one or more second tuples, each second tuple linking one of the user identifiers associated with the third party processing circuit to one of the bridge identifiers. In some implementations, the method includes generating, by the third party processing circuit, a bridge identifier map by exponentiating the bridge identifiers of the one or more second tuples with a second exponent, exponentiating, by the third party processing circuit, the one or more exponentiated first tuples with the second exponent, sending, by the third party processing circuit to the first party processing circuit, the one or more exponentiated first tuples, and generating, by the first party processing circuit, a bridge identifier map for the first party processing circuit by removing the first exponent from the one or more exponentiated first tuples.

In some implementations, the encrypting, by the first party processing circuit, the first data set includes encrypting the user identifiers associated with the first party processing circuit with an El-Gamal key and encrypting the match keys associated with the first party processing circuit with a first party deterministic key. In some implementations, the method further includes encrypting, by the third party processing circuit, the one or more first data sets to generate one or more double encrypted first data sets by encrypting the encrypted match keys associated with the first party processing circuit with a third party deterministic encryption key and raising the encrypted user identifiers encrypted with the El-Gamal key to an exponent.

In some implementations, the method includes sending, by the first party processing circuit to the third party processing circuit, a first party El-Gamal key, the first party El-Gamal key is a public key of the first party processing circuit and receiving, by the first party processing circuit from the third party processing circuit, a third party El-Gamal key, the third party El-Gamal key is a public key of the third party processing circuit. In some implementations, the method includes encrypting, by the first party processing circuit, the one or more first data sets includes encrypting, by the first party processing circuit, the one or more first data sets with the first party El-Gamal key and a first party deterministic key. In some implementations, the method includes encrypting, by the third party processing circuit, the encrypted one or more first data sets with a third party deterministic key to generate one or more double encrypted first data sets and encrypting, by the third party processing circuit, the encrypted one or more second data sets by encrypting the match keys associated with the third party processing circuit with the third party deterministic key. The method may include encrypting, by the first party processing circuit, each of the assigned bridge identifiers with the first party El-Gamal key and the second party El-Gamal key, sending, by the first party processing circuit to the third party processing circuit, one or more first tuples including the encrypted bridge identifiers and associated user identifiers associated with the first party processing circuit and sending, by the first party processing circuit to the third party processing circuit, one or more second tuples including the encrypted bridge identifiers and associated user identifiers associated with the third party processing circuit.

In some implementations, the method includes generating, by the third party processing circuit, a bridge identifier map for the third party processing circuit by decrypting the one or more second tuples with the third party El-Gamal key, de-exponentiating, by the third party processing circuit, the one or more first tuples and send the de-exponentiated one or more first tuples to the first party processing circuit, and generating, by the first party processing circuit, a bridge identifier map for the first party processing circuit by decrypting the one or more first tuples with the first party El-Gamal key.

DETAILED DESCRIPTION

Figure 1:
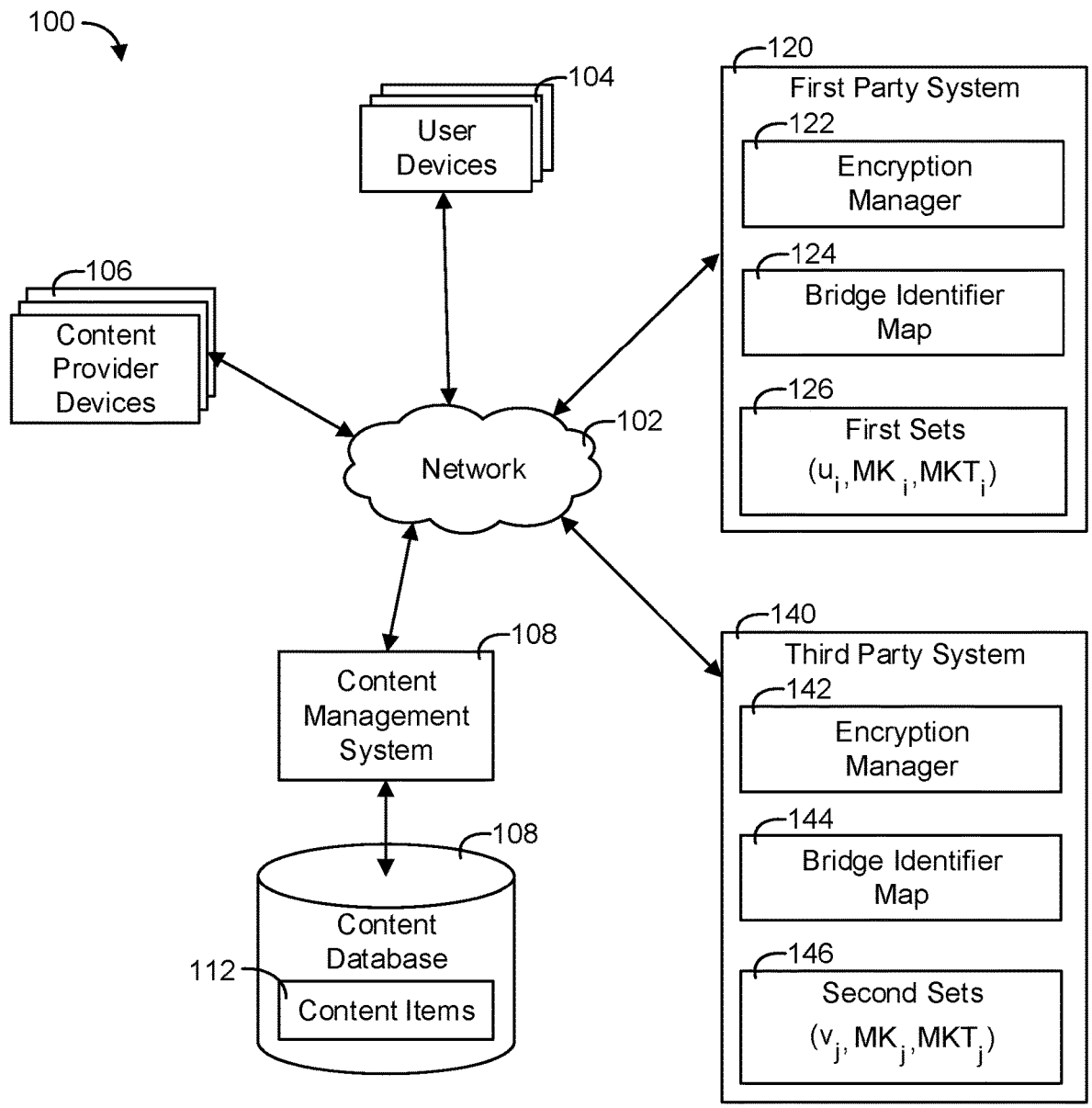
FIG. 1 is a block diagram of a first party system and a third party system and an associated environment, according to an illustrative implementation.

Referring generally to the FIGURES, systems and methods for establishing a link between user identifiers of a first party system and user identifiers of a third party system without disclosing specific identifying information are shown and described, according to various illustrative implementations. Content systems can store personal identifiable information (PII) shared by users who visit a business's website, e.g., to view content or conduct transactions. PII may be, for example, an email address, a phone number, a phone identifier number, a cookie identifier, etc. Content systems can map the PII to user identifiers (IDs) that distinguish users from each other. For example, if a user is associated with an Email Address A and a Phone Number A, the content system may map the Email Address A and the Phone Number A to a single user ID, user ID A.

One approach to establishing this linkage involves the third party system providing, to the company, a user ID paired with hashed PII data. Cryptographic hashing functions are designed to be practically non-invertible (i.e., irreversible). Since the hashing function is irreversible, possession of hashed data does not result in possession of the corresponding input data. The hashed PII data is the output from applying a hashing function to the PII data, allowing for comparison of PII data elements without revealing the PII data itself.

In some implementations, the data partner may provide a user ID for a user and a hashed value of the user's email address. The company then compares the third party system's hashed PII data to the first party system's hashed PII data to establish a link between the user ID of the third party system and the user ID of the first party system. This approach works well when using only a single PII data element, such as when matching a user ID of a first party system and a user ID of a third party system based only on one PII, e.g., a user's email address.

However, to match on multiple PII data elements (e.g., both a user's email and phone number), the third party system must provide a user ID paired with both a hashed email and a hashed phone number. Consequently, this reveals internal data linkages to the first party system, i.e., it reveals the third party system's email address to phone number links for the particular user. Sharing information between the first party system and third party system to match on multiple PII data elements in this manner may provide enough information to reveal the identity of a specific user linked to the PII data elements.

Accordingly, the present disclosure is directed to systems and methods for establishing a link between the user IDs of two parties without exposing one or both parties' user ID to PII data map to the other party. In some implementations, the described systems and methods involve both parties learning a bridge ID, such as a bridge ID that is deterministically exponentiated.

More specifically, two parties are discussed herein, a first party system and a third party system. In some implementations, each of the parties may store a private database of data for users that is mapped by a particular user IDs. Furthermore, the databases may include PII data elements for each of the users, linked to the user IDs. The user IDs of the first party system and the third party system may have different formats and can be difficult to compare for equality. The systems and methods herein detail steps for learning common bridge identifiers BIDs for users in their respective databases, allowing for equality checking without either of the parties learning extra data about each other's users.

In some implementations, neither party should learn any additional PII data element for any user in either its own database, or in the other party's database. In some implementations, neither party should learn additional "linkages" between users in its own database, for example, that two distinct users in its own database are believed to be the same user by the other party. Further, some of the methods described herein restrict at least one of the parties from learning which users were in an intersection.

As used herein, $u_i$ may denote the $i^{th}$ user ID for a first party system (may be ephemeral IDs). Each $u_i$ can have up to t ($MK_{i,k}$, $MKT_{i,k}$) pairs for the first party system. A match key (MK) may be, include, or be associated with a PII data element. Examples of a MK are an email address, a phone number, and an IP address. A match key type (MKT) may indicate a type or characteristic of the information. For example, for a MK abc@123.com, the MKT may be a string "Email Address" or any other piece of data indicating that the MK is an email address.

As used herein, $v_j$ can be a corresponding pseudonym for the $j^{th}$ user ID associated with a third party system. Each $v_j$ can also have up to t ($MK_{j,k}$, $MKT_{j,k}$) pairs associated with it. In some implementations, $u_i$ and $v_j$ are pseudo-random numbers, strings, or other pieces of data selected by the first party system and the third party system respectively. The values for $u_i$ and $v_j$ can be constant for the duration of performing one or more of the methods described herein.

In some implementations, $u_i$ and $v_j$ are determined by the first party system and the third party system respectively via a hash function before or at the start of performing the methods described herein. For example, $u_i$ values may be selected via the equations $u_i$=hash(KF,$UID_i$) and $v_j$=hash(K3P,$PID_j$) where keys KF, K3P may be keys (e.g., numeric values) known only to the first party system and third the third party system, respectively. In some implementations, $UID_i$ and $PID_j$ could be the name of a user, a PII of a user, or any other user defining information. Since the values $UID_i$ and $PID_j$ are hashed with a secret key, KF and K3P, they may be encrypted and personal information of the user may be safe. The hash( ) function could be any kind of hash function including Secure Hash Algorithm (SHA)-256, MD5, BLAKE-256, and/or any other type of cryptographic hash function.

As described further herein, the systems and methods can enable the first party system to learn a $u_i$:$BID_{i,k}$ map, where each $u_i$ can map to up to t $BID_{i,k}$ values. Some of the $BID_{i,k}$ values may be dummy values. The third party system can be configured to learn a $v_j$:$BID_{j,k}$, where each $v_j$ maps to only a single BID.

Furthermore, in some implementations of the systems and methods described herein, at the end of the encryption methods, the first party will learn which of the $u_i$ values are in an intersection (two sets A and B have an intersection C where C is all elements of A that belong to set B, i.e., A∩B). In contrast, the third party system may learn nothing more than the $v_j$:$BID_{j,k}$ map and the size of the data set of the first party system. In particular, the third party system may learn neither the intersection elements nor the intersection size.

As used herein, the notation, F[ ] and T[ ] can denote single-deterministic Elliptic Curve Cryptography (ECC) exponentiation with the exponents F and T respectively. The notation, FT[ ] denotes double-deterministic encryption, with both exponents F and T. F can represent a deterministic encryption key for the first party system. In some implementations, F may be a secret key that the first party system does not share with the third party system. Similarly, in some implementations, T may be another deterministic encryption key for performing deterministic encryption by the third party system. The third party system may keep T as a secret and not directly share it with the first party system.

Furthermore, the notation $E_F[\ ]$ can denote El-Gamal encryption with a key F. F represent a first El-Gamal party key for an El-Gamal encryption that can be performed by the first party system. The first party system can store the first party El-Gamal key, perform encryption with the first party El-Gamal key, and/or transmit the first El-Gamal key to the third party system. $E_T$ can represent an El-Gamal encryption key of the third party system. The third party system can store the third party El-Gamal key, perform encryption with the third party El-Gamal key, or transmit the third party El-Gamal key to the first party system. The El-Gamal keys, $E_F$ and $E_T$ may be public keys of the first party system and the second party system respectively.

The cryptographic methods described herein may rely on two specific properties of two different types of encryption, the commutative property and the homomorphism property. The homomorphic property indicates that for a function, $f[\ ]$, $f[x]*f[y]=f[x*y]$. El-Gamal encryption is homomorphic. Specifically, for an El-Gamal encryption function $E[\ ]$, $E[x]*E[y]=E[x*y]$.

Deterministic encryption (deterministic ECC) with $F[\ ]$ and $T[\ ]$, where $F[\ ]$ is encryption of the first party system and $T[\ ]$ is encryption of the second party system may be commutative. Furthermore, El-Gamal encryption may be commutative. Specifically, the commutative property is $T[F[x]]=F[T[x]]$. As an example, the first party system and the third party system can each have MK values, $x_1$ and $x_2$ respectively. The first party system or the third party system can determine whether $x_1$ and $x_2$ are equal based on the commutative property without disclosing the actual values of $x_1$ and $x_2$ to each other. Without disclosing the encryption methods $F[\ ]$ and $T[\ ]$ to each other and without disclosing the values $x_1$ and $x_2$, the first and third party system can compute double encrypted versions of $x_1$ and $x_2$, i.e., $T[F[x_1]]$ and $F[T[x_2]]$. If $x_1=x_2$ then $T[F[x_1]]=F[T[x_2]]$. Similarly, if $x_1 \ne x_2$, then $T[F[x_1]] \ne F[T[x_2]]$. This allows the first and third party systems to check whether $x_1$ is equal to $x_2$ without disclosing the actual values for $x_1$ and $x_2$ or the deterministic encryption of each system. This is described in further detail with reference to the methods described herein.

Referring now to FIG. 1, a block diagram of a first party system 120, a third party system 140, and an associated environment 100 is shown according to an illustrative implementation. One or more user devices 104 may be used by a user to perform various actions and/or access various types of content, some of which may be provided over a network 102 (e.g., the Internet, LAN, WAN, etc.). A "user" or "entity" used herein may refer to an individual operating user devices 104, interacting with resources or content items via the user devices 104, etc. The user devices 104 may be used to access websites (e.g., using an internet browser), media files, and/or any other types of content. A content management system 108 may be configured to select content for display to users within resources (e.g., webpages, applications, etc.) and to provide content items 112 from a content database to the user devices 104 over the network 102 for display within the resources. The content from which the content management system 108 selects items may be provided by one or more content providers via the network 102 using one or more content provider devices 106.

In some implementations, the content management system 108 may select content items from content providers to be displayed on the user devices 104. In such implementations, the content management system 108 may determine content to be published in one or more content interfaces of resources (e.g., webpages, applications, etc.). The content management system 108 can be configured to conduct a content auction among third-party content providers to determine which third-party content is to be provided to the user device 104. The auction winner can be determined based on bid amounts and a quality score (i.e., a measure of how likely the user of the user device 104 is to click on the content). In some implementations, the content management system 108 allows content providers to create content campaigns. A campaign can include any number of parameters, such as a minimum and maximum bid amount, a target bid amount, or one or more budget amounts (e.g., a daily budget, a weekly budget, a total budget, etc.).

The first party system 120 and the third party system 140 can include one or more processors (e.g., any general purpose or special purpose processor), and can include and/or be operably coupled to one or more transitory and/or non-transitory storage mediums and/or memories (e.g., any computer-readable storage media, such as a magnetic storage, optical storage, flash storage, RAM, etc.). In various implementations, the first party system 120 and/or the third party system 140 and the content management system 108 can be implemented as separate systems or integrated within a single. For example, the first party system 120 may be associated with and/or be a part of a first content management system (e.g., the content management system 108) while the third party system 140 may be part of a second content management system (e.g., a content management system similar to the content management system 108).

The first party system 120 and/or the third party system 140 can be communicably and operatively coupled and/or include data storage devices e.g., databases. The first party system 120 and/or the third party system 140 can be configured to query the databases for information and store information in the databases. In various implementations, the databases include various transitory and/or non-transitory storage mediums. The storage mediums may include but are not limited to magnetic storage, optical storage, flash storage, RAM, etc. The database and/or the first party system 120 and/or the third party system 140 can use various APIs to perform database functions (i.e., managing data stored in the database). The APIs can be but are not limited to SQL, ODBC, JDBC, etc.

The first party system 120 and/or the third party system 140 can be configured to receive information from the network 102. The information may include browsing histories, cookie logs, television advertising data, printed publication advertising data, radio advertising data, online activity data and/or any other indication or interactions with an online resources that a user (i.e., user devices 104) may have on the network 102. The first party system 120 and/or the third party system 140 can be configured to receive and/or collect the interactions that the user devices 104 have on the network 102. This information may be stored by the first party system 120 and/or the third party system 140.

The first party system 120 and/or the third party system 140 may include one or more modules (i.e., computer-readable instructions executable by a processor) and/or circuits (i.e., ASICs, Processor Memory combinations, logic circuits, etc.) configured to perform various functions. In some implementations, the modules may be or include the encryption manager 122 and the encryption manager 142. Furthermore, the first party system 120 and/or the third party system 140 may store a bridge identifier map 124 and/or a bridge identifier map 144 and user data, i.e., the input data 126 and the input data 146.

The encryption manager 122 and the encryption manager 142 can be configured to perform the various encryption methods described herein. Furthermore, the encryption manager 122 and the encryption manager 142 can perform specific encryption steps, e.g., deterministic EC encryption, El-Gamal encryption, and decryption methods. The encryption manager 122 of the first party system 120 can be configured to encrypt data to be sent to the third party system 140 and decrypt data received from the third party system 140. Likewise, the encryption manager 142 of the third party system 140 can be configured to encrypt data to be sent to the first party system 120 and decrypt data received from the first party system. In some implementations, the encryption managers 122 and 142 can be configured to perform the methods described herein.

In some implementations, the inputs for the encryption manager 122 of the first party system 120 are one or more first sets 126, triples of the form $(u_i, MK_i, MKT_i)$. There can be several triples with the same $u_i$. It may be assumed that no two triples share the same $MK_i$, i.e., no two $u_i$ are linked to the same $MK_i$. However, multiple $MK_i$ can be linked to a single $u_i$.

The input of the encryption manager 142 of the third party system 140 input may be the one or more second data sets 146, triples of the form $(v_j, MK_j, MKT_j)$. As with the one or more first sets 126 of the first party system 120, there can be several triples with the same $v_j$, but no two triples sharing the same $MK_j$. In some of the methods described herein, the $MKT_i$ and $MKT_j$ values are passed "in the clear," i.e., they may be communicated between the first party system 120 and the third party system 140 without being encrypted. For this reason, some of the methods herein do not show the $MKT_i$ and $MKT_j$ being communicated between the first party system 120 and the third party system 140. Any time an MK value is communicated between the first party system 120 and the third party system 140, a corresponding MKT value may also be communicated.

The bridge identifier map 124 may be a map linking a user ID, $u_i$, to a bridge ID, BID. The bridge identifier map 124 may be the product of performing the methods described herein. The bridge identifier map of the first party system 120, i.e., the bridge identifier map 124, may be a map where each $u_i$ maps to one or multiple BID values.

The bridge identifier map 144 may be similar to the bridge identifier map 124. The bridge identifier map 144 may map $v_j$ to BID. The bridge identifier map 144 may be the product of performing the methods described herein. However, unlike the bridge identifier map 124, all of the $v_j$ of the third party system 140 may only map to a single BID.

Figure 2A:
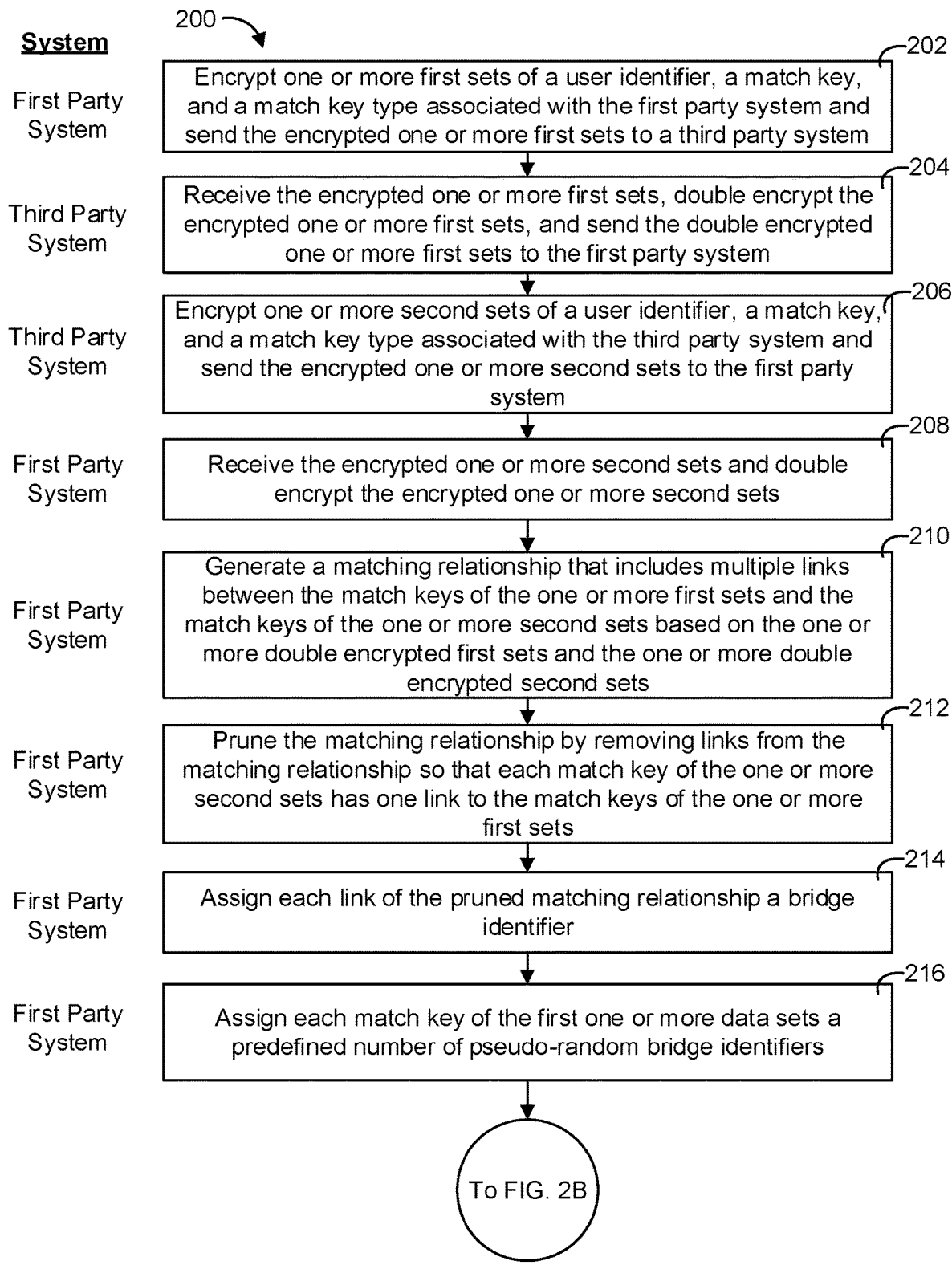
FIGS. 2A and 2B are flowcharts of a process for establishing a link between user identifiers of the first party system and the third party system without disclosing internal user identifier links, according to an illustrative implementation.
Figure 2B:
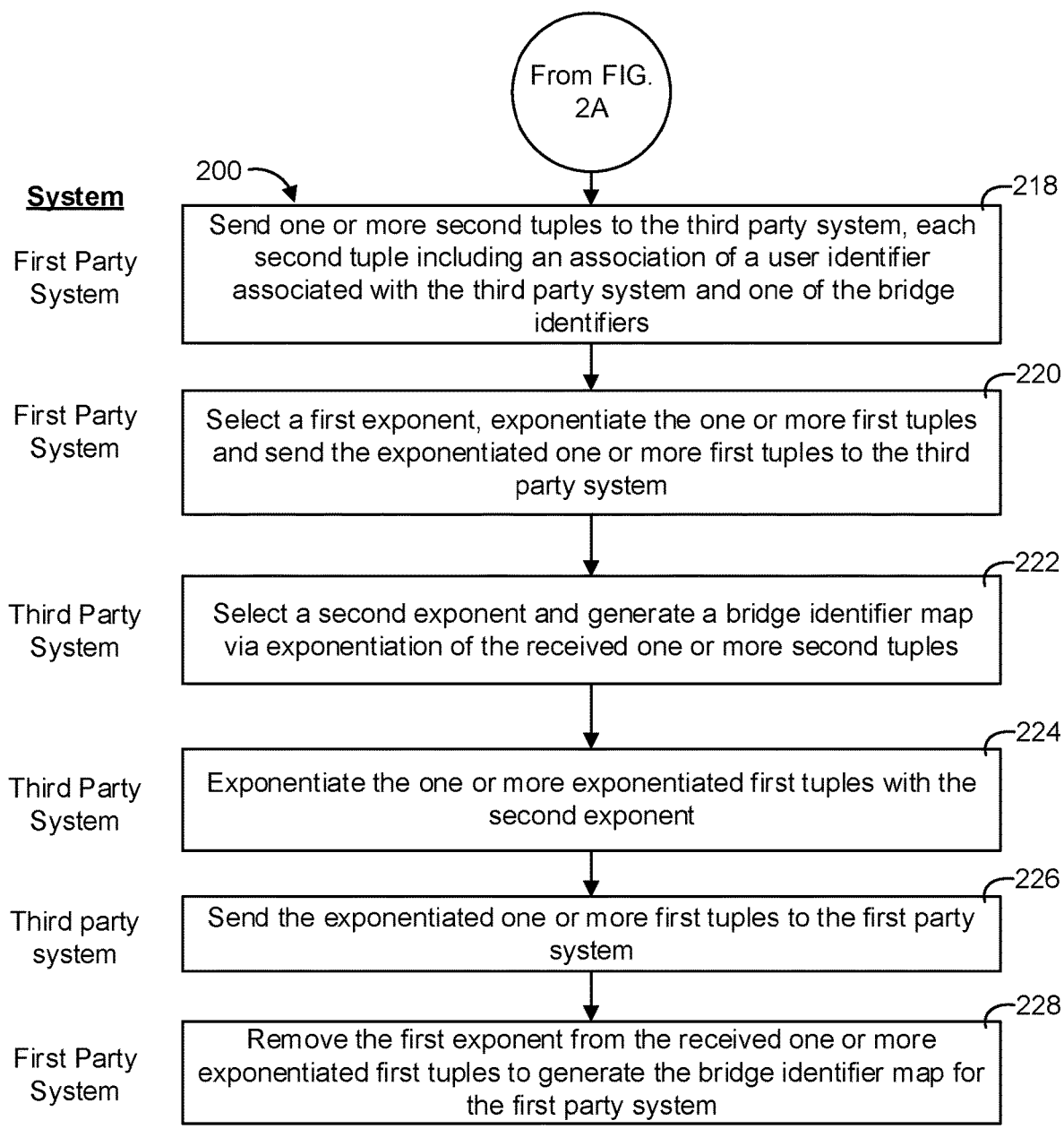

Referring now to FIGS. 2A and 2B, a process 200 is shown for establishing a link between user IDs of the first party system 120 and the third party system 140, according to an illustrative implementation. The first party system 120 and the third party system 140 can be configured to perform the steps of process 200. Furthermore, any one or combination of computing devices described herein can be configured to perform the process 200.

Figure 2C:
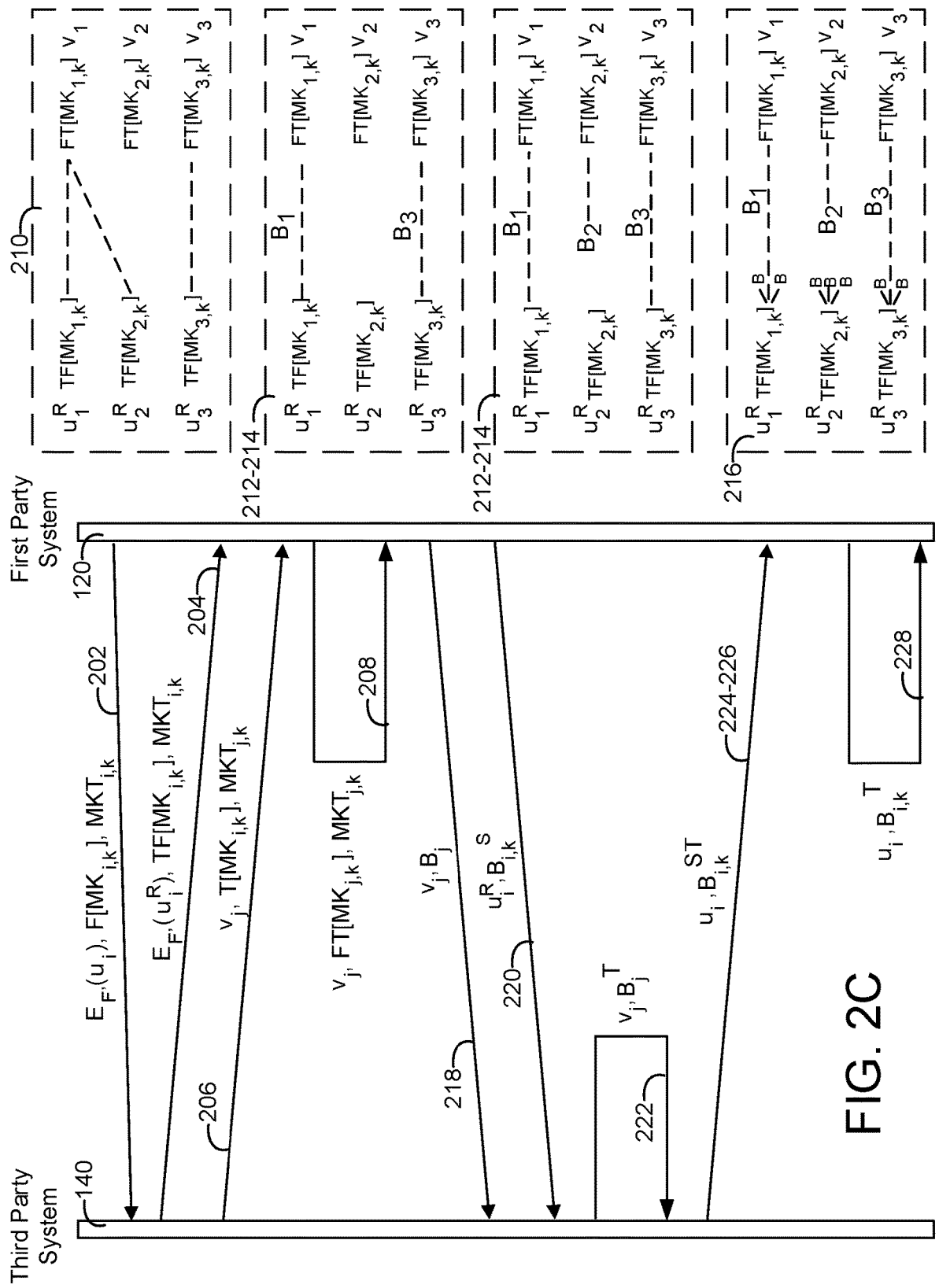
FIG. 2C is a transmission diagram for the flowchart of FIGS. 2A and 2B illustrating the method of FIGS. 2A and 2B in greater detail, according to an illustrative implementation.

Referring to FIG. 2C, a transmission diagram if shown illustrating the process 200 in greater detail. The transmission diagram of FIG. 2C illustrates the data transmitted between the first party system 120 and the third party system 140, in addition to illustrating the matching relationship generating steps, the matching relationship pruning steps, and the BID assignment steps.

Referring more particularly to FIGS. 2A and 2B, in step 202, the first party system 120 can encrypt the first data sets 126 and send the encrypted data sets 126 to the third party system 140. As previously described, the first data sets 126 may be one or more sets of a user ID, $u_i$, a match key $MK_i$, and a match key type for the $MK_i$, $MKT_i$.

In step 202, the first party system 120 can be configured to select a value for a first party encryption, F (e.g., an ECC exponentiation key), and an El-Gamal Key, F'. Based on the selected keys F and F', the first party system 120 can encrypt MK data that it stores. Specifically, the first party system 120 can encrypt $u_i$ values that it stores with the El-Gamal Key F', encrypt the MK values it stores with the ECC exponentiation key F, and leave the MKT values that it stores unencrypted. The result may be $E_{F'}(u_i)$, $F[MK_{i,k}]$, $MKT_{i,k}$. The first party system 120 can send the result to the third party system 140. In some implementations, there may be multiple tuples, i.e., MK and MKT combinations that are associated with the same underlying $u_i$.

In step 204, third party system 140 can receive the encrypted first set 126, double encrypt the encrypted first data sets 126, and send the double encrypted first data sets 126 to the first party system 120. The third party system 140 can select a value T. The value T can be an ECC exponentiation key. Furthermore, the third party system 140 can select a value R, a deterministic key. The third party system 140 can encrypt the encrypted data it receives in step 202 from the first party system 120. This may be referred to as a double encryption.

The third party system 140 can double encrypt the data it receives in step 202, $E_{F'}(u_i)$, $F[MK_{i,k}]$, $MKT_{i,k}$, with the selected value T and the selected value R. Specifically, the third party system 140 can exponentiate the received $u_i$, and double encrypt $F[MK_{i,k}]$ with the value T. The third party system 140 may leave $MKT_{i,k}$ unencrypted. The result may be $E_{F'}(u_i^R)$, $FT[MK_{i,k}]$, $MKT_{i,k}$. The third party system 140 can send the result back to the first party system 120. In some implementations, the third party system 140 can sort or shuffle the order of the result.

In step 206, the third party system 140 encrypts the second sets 146 stored by the third party system 140 with the selected value T from step 204. The third party system 140 can encrypt MK values associated with specific v values and MKT values. Specifically, the third party system can encrypt the MK values that it stores with the selected value T. The result may be $(v_j, T[MK_{j,k}], MKT_{j,k})$. The third party system 140 can send the result to the first party system 120. In some implementations, the third party system 140 sorts and/or shuffles the encrypted second data sets 146 before sending the encrypted second data sets 146 to the first party system 120.

In step 208, the first party system 120 can double encrypt the encrypted sets 146 that the third party system 140 sends the first party system 120 in step 206, i.e., the first party system 120 can double encrypt the received sets $(v_j, T[MK_{j,k}], MKT_{j,k})$. Specifically, the third party system 140 can encrypt the $T[MK_{j,k}]$ values with F. The result may be $(v_j, FT[MK_{j,k}], MKT_{j,k})$.

In step 210, the first party system 120 can generate a matching relationship including multiple links between the match keys of the first set 126 and the match keys of the second set 146 where the match keys of the first set 126 and the second set 146 are both double encrypted. The matching relationship can be visually represented as a graph (e.g., as shown in FIG. 2C) but may be any a data element indicating relationships between various values.

From the first data sets, the first party system 120 may have $TF[MK_{i,k}]$ values while from the second data sets $FT[MK_{j,k}]$. The encryption with T and F may be commutative, i.e., where $MK_{i,k}$ is equal to $MK_{j,k}$, $TF[MK_{i,k}]$ is equal to $FT[MK_{j,k}]$. Therefore, intersections between the $TF[MK_{i,k}]$ and $FT[MK_{j,k}]$ can be determined based on which $TF[MK_{i,k}]$ and $FT[MK_{j,k}]$ values are equal. The matching relationship is described visually in FIG. 3C. The vertices of the matching relationship may represent blinded user IDs, i.e., $u_i^R$ decrypted values and $v_j$ values. An edge (a link) between two vertices may represent matching TF[$MK_{i,k}$] and FT[$MK_{j,k}$] values.

In step 212, the first party system 120 can prune the matching relationship by removing links from the matching relationship so that each MK of the second data sets 146 has only one link to the MKs of the first data set 126. Specifically, the first party system 120 can prune the matching relationship so that each $v_j$ vertex has only one associated edge. This can prevent the first party system 120 from learning whether two of the user IDs associated with the first party system 120 correspond to a single user ID of the third party system 140. The first party system 120 can use the number of repeated matches and the MKT of the matches to help choose the best edge to preserve. For example, certain MKT values may indicate which links should be preserved. Links associated with email addresses may be preserved while links associated with home residence addresses may be discarded.

Each $u_i^R$ may still have multiple edges associated with it. In step 214, the first party system 120 can pseudo-randomly assign pseudo-random bridge identifiers, B, to the associated vertices. The value B may be selected by the first party system 120 from a BID space. The BID space may be a set of values that are possible values for B. One or more parameters may define the BID space. For example, one or more parameters may define an elliptic curve from which the values are selected. The value B can be associated with vertices of $u_i^R$ and $v_j$. For all vertices $v_j$ not associated with a value B, the first party system 120 can assign a new pseudo-random value $B_j$ to it.

For all vertices $u_i^R$ not associated with any B, the first party system 120 can replace the vertex with a dummy $u_i^R$ value chosen pseudo-randomly from the EC group and different from all other $u_i^R$ values. The first party system 120 may not know R, but can choose any random and distinct element in the EC group, and it will be of the form $u_i^R$ for some unknown $u_i$. The first party system 120 may not know what $u_i$ the value will de-exponentiate to, but this is not a problem as long as the fresh $u_i^R$ is distinct from all previous ones.

In step 216, for all vertices $u_i^R$ including the fresh replacements from the preceding step 214, the first party system 120 can assign a predefined number of pseudo-random bridge identifiers. The first party system 120 can associate each vertices additional new, pseudo-random $B_{i,k}$ values until each $u_i^R$ has t associated values.

In step 218, the first party system 120 can send the third party system 140 one or more second tuples. Each tuple may include an association of a user ID associated with the third party system 140, $v_j$ and a bridge identifier, $B_j$. Specifically, the tuples may be sets of ($v_j$, $B_j$). The value $B_j$ may be the bridge identifier associated with the user ID of the third party system 140, $v_j$.

In step 220, the first party system can select a first exponent and exponentiate one or more first tuples and send the exponentiated one or more first tuples to the third party system 140. The first party system 120 can select the first exponent to be an ECC exponent. The selected ECC exponent may be an exponent S. The first party system 120 can determine the first tuples for the user identifier associated with the first party system 120, $u_i^R$ and associated bridge identifiers, $B_{j,k}$. The first party system 120 can exponentiate the bridge identifiers of the second tuples with the exponent S. The result may be tuples ($u_i^R$, $B_{i,k}^S$). For each i and k, each $u_i^R$ may be associated with a $B_{i,k}$. The replaced $u_i^R$ values may also be included.

In step 222, the third party system 140 can select a second exponent and generate the bridge identifier map 144 via exponentiation of the received one or more second tuples of step 218. The bridge identifier map 144 may include an association of the user IDs associated with the third party system 140 and the bridge identifiers received in step 220. The exponent selected by the third party system 140 may be an exponent T for the BID space. The third party system 140 can determine pairs ($v_j$, $B_j^T$) based on the tuples received in step 218, ($v_j$, $B_j$). The third party system 140 can verify that none of the pairs have repeated $B_j^T$ values in the second position. The third party system 140 can use these pairs in its bridge identifier map 144, $v_j$:$BID_j$. The map may be $BID_j = B_j^T$.

Before proceeding, the third party system 140 can verifies that no two of the ($u_i^R$, $B_{i,k}^S$) pairs have the same $B_{i,k}^S$ value. If there are two pairs with the same $B_{i,k}^S$ value, the third party system 140 may abort the process 200. Otherwise, the third party system 140 may continue to step 224.

In step 224, the third party system 140 can encrypt the one or more exponentiated first tuples (received in step 220) including the user identifiers associated with the first party system 120 and an associated bridge identifier exponentiated by the first exponent (S) and the second exponent (T). Specifically, the third party system 140 can exponentiate the first tuples ($u_i^R$, $B_{i,k}^S$) with the second exponent, T and remove R. In this regard, in step 226, the third party system 140 can send all such tuples ($u_i$, $B_{i,k}^{ST}$) to the first party system 120 after being sorted and/or shuffled.

In step 228, the first party system 120 can remove the first exponent S from the received exponentiated one or more first tuples of steps 224. By removing the first exponent, the first party system 120 can generate the bridge identifier map for the first party system 120. Of the tuples received, the first party system 120 can discard all those tuples do not correspond to a $u_i$. In doing so, the first party system 120 will discard all the dummy $u_i$ values introduced in step 216, and preserves only those $u_i$ that matched with at least one $v_j$. The freshly chosen $u_i^R$ in 216 were distinct from all others, and so will always de-exponentiate to different $u_i$ from those first party system 120 originally supplied in step 202.

For all remaining $u_i$, the first party system 120 can remove the power S in the second positions of the received pairs to recover pairs of the form ($u_i$, $B_{i,k}^T$) from the tuples received in step 226, ($u_i$, $B_{i,k}^{ST}$), and constructs the $u_i$:$BID_{i,k}$ map, where $BID_{i,k} = B_{i,k}^T$. Note that each $u_i$ may be associated with several $BID_{i,k}$, some real, and some fake as inserted in step 216. The first party system 120 may not know which ones are fake.

At the conclusion of the process 200, the first party system 120 has learned which of its user IDs, $u_i$, matched with user IDs, $v_j$, of the third party system 140. In subsequent methods, the first party system 120 can also learn which of its associated BIDs are real and fake; fake BIDs will never appear in an intersection. In subsequent transaction uploads, if multiple BIDs supplied by the third party system 140 match with those associated with a single $u_i$, then the first party learns that multiple third party IDs matched to a single user ID.

In some implementations, this leakage can be prevented by additionally pruning the PII graph in 212, so that both $u_i^R$ and $v_j$ vertices have at most 1 associated edge. This is described with further reference to process 300 of FIG. 3. In some implementations, if the third party system 140 receives no unblinded information at all, it learns nothing beyond its BID map and the size of the data of the first party system 120. The first party system 120 can learn the blinded structure of the PII matching graph. However, a positive side to this leakage is that the first party system 120 can leverage the graph structure to improve link-pruning.

In some implementations, the process 200 can be modified so that the first party system 120 cannot learn which of its user IDs matched. Some modifications to the process 200 make use of the BIDs as user IDs that never matched and will never appear in an intersection. In some implementations, the third party system 140 can receive no unblinded information learning very little beyond the size of the first party's data. The first party can leverage the graph structure to optimize link-pruning.

In some implementations in which the first party system 120 can no longer learn which of its user IDs matched, the third party system 140 can no longer learn links between the user IDs of the third party system 140, because after the first party system 120 intersects on MK values, the third party only sees blinded BIDs and encrypted user IDs. The third party may, instead of seeing more information in step 228, may not see the information, so that the third party performs the pruning blindly. It is possible to modify the process 200 to provide either of the two quality-vs-leakage tradeoffs.

Figure 3A:
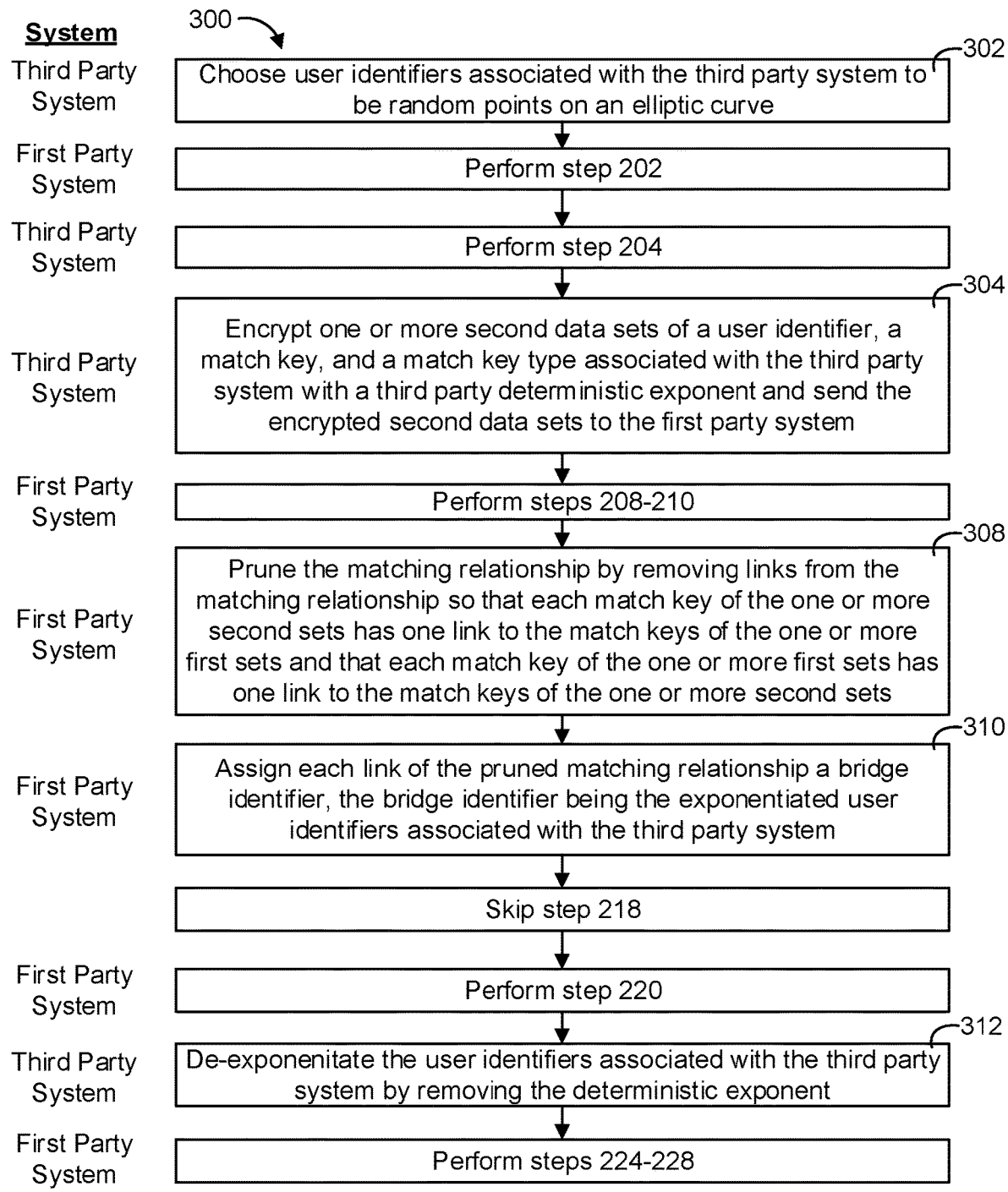
FIG. 3A is a flowchart of a process for using bridge identifiers for establishing a link between user identifiers of the first party system and the third party system, where the bridge identifiers are exponentiated user identifiers of the third party system, according to an illustrative implementation.

Referring now to FIG. 3A, a process 300 is shown for establishing a link between user IDs of the first party system 120 and the third party system 140 where bridge IDs are user IDs of the third party system 140, according to an illustrative implementation. Selecting bridge IDs as user IDs may simplify data flow, improving the process. The first party system 120 and the third party system 140 can be configured to perform the steps of process 300. Furthermore, any one or combination of computing devices described herein can be configured to perform the process 300. The process 300 may be similar to the process 200 as described with reference to FIGS. 2A-2C. The process 300 may include many of the same steps as the process 200. However, process 300 may differ from process 200 in at least one way by using user IDs of the third party system 140 as bridge IDs.

Figure 3B:
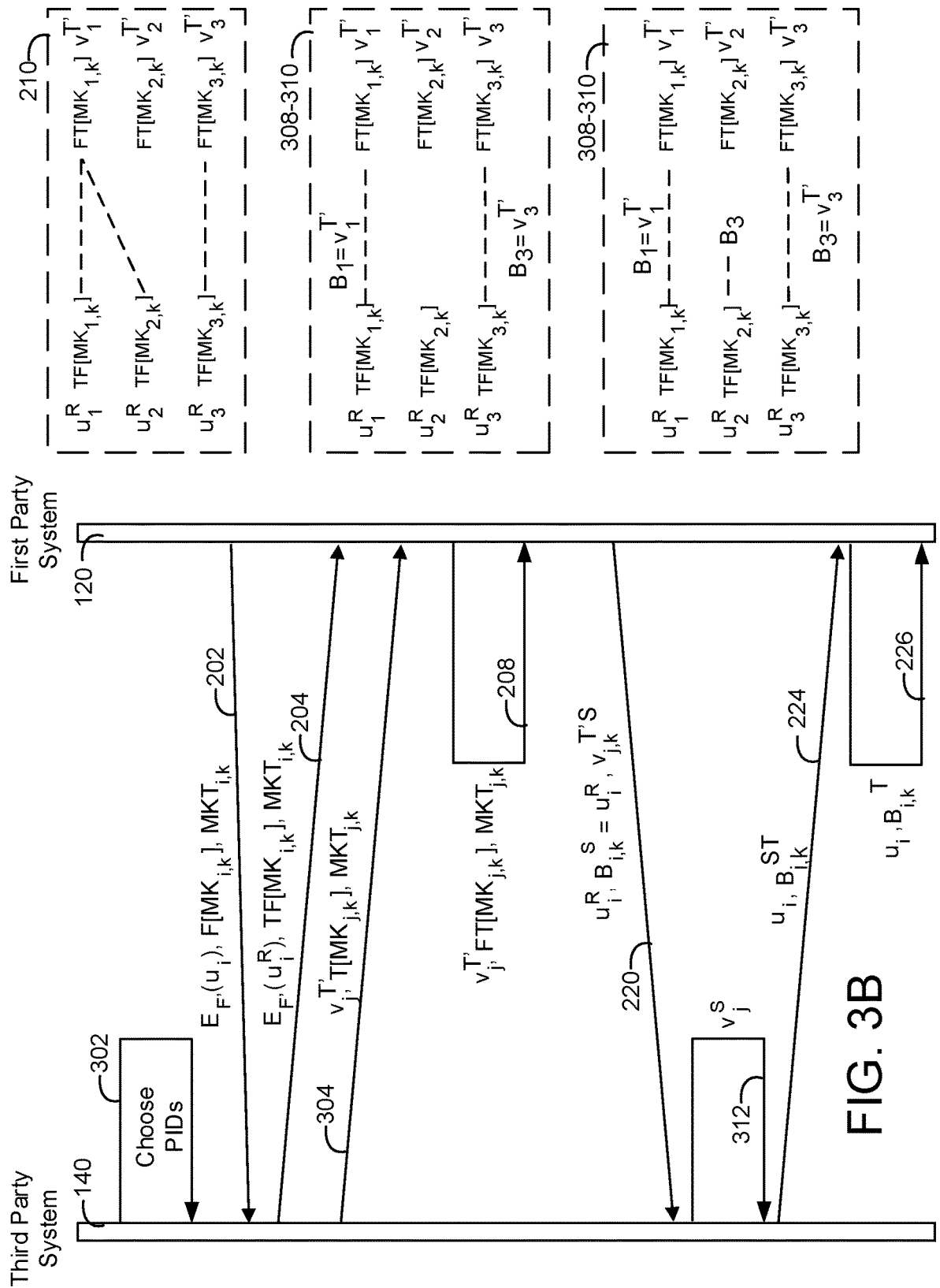
FIG. 3B is a transmission diagram for the process of FIG. 3A, according to an illustrative implementation.

Referring to FIG. 3B, a transmission diagram if shown illustrating the process 300 in greater detail. The transmission diagram of FIG. 3B illustrates the data transmitted between the first party system 120 and the third party system 140 in addition to illustrating the matching relationship generating steps, the matching relationship pruning steps, and the BID assignment steps.

Referring more particularly to FIG. 3A, in step 302, the third party system 140 can choose pseudo-random values for the user IDs associated with the third party system 140. These values, $v_j$, can be pseudo-random values chosen by pseudo-randomly selecting points on an elliptic curve. The process 300 can include steps 202 and 204 of process 200 after step 302 is performed. These steps can be performed by the first party system and the third party system respectively.

In step 304, the third party system 140 can encrypt the second data sets 146 and send the encrypted second data sets 146 to the first party system 120. The second data sets 146 can include, as previously described, a user ID associated with the third party system 140, $v_j$, a MK value linked with the user ID, and a MKT value for the MK value. The one or more second data sets may be $v_j$, $MK_{j,k}$, $MKT_{j,k}$.

The third party system 140 can encrypt the one or more second data sets with a deterministic exponent, T' and a deterministic exponent T. Specifically, the third party system 140 can encrypt the user IDs associated with the third party system 140 with the exponent T' and the MKs associated with the third party system 140 with the exponent T. The result may be one or more sets of $v_j^{T'}$, $T[MK_{j,k}]$, $MKT_{j,k}$. The third party system 140 can send this result to the first party system 120. After step 304, the process 300 the third party system 140 can perform the steps 208-210 as described with further reference to FIGS. 2A-2C and process 200 with $v_j^{T'}$ instead of $v_j$. The first party system 120 can perform the steps 208-210.

In step 308, the first party system 120 can prune the matching relationship generated in step 210. The first party system 120 can prune the matching relationship by removing links from the matching relationship such that each MK of the second data sets 146 has one link to the MKs of the first data set 126 and furthermore so that each MK of the first data sets 126 has one link to the MKs of the second data set 146.

In step 310, the first party system 120 can select bridge IDs for the links between the MKs of the one or more first data sets and the MKs of the second data sets 146, the bridge IDs to be the exponentiated user identifiers associated with the third party system 140. More specifically, the selected bridge IDs may be by the encrypted user IDs associated with the third party system 140. The bridge IDS, $B_i$, can be the $v_i^{T'}$ values. This is visually illustrated in FIG. 3B where a $B_1$ value for a link between $TF[MK_{1,k}]$ for a $u_1^R$ and $FT[MK_{1,k}]$ for a $v_1^{T'}$ is assigned the value $v_1^{T'}$. If a identifier of the first party system 120 does not match to an identifier of the third party system 140, the first party system 120 may assign it a random bridge ID. For example, in FIG. 3B, $B_3$. This random assignment can be performed the same as in step 214 of the process 200 as described with reference to FIGS. 2A-2C.

Process 300 may skip steps 218 of process 200 since this step may not be required. In step 218, the tuple ($v_j$, $B_j$) may be sent from the first party system 120 to the third party system 140. However, this is the same as sending tuples of the form ($v_j^{T'}$, $v_j^{T'}$) which is redundant. However, process 300 may include performing step 220. In step 220, the first party system 120 can send tuples including the user IDs associated with the first party system 120 and an associated bridge ID. The tuples may be $u_i^R$, $B_{i,k}^S$. However, since the bridge IDs chosen in step 308 may be the user IDs associated with the third party system 140, the tuples may be $u_i^R, v_{j,k}^{T'S}$. This is illustrated in the transmission diagram of FIG. 3B.

In step 312, the third party system 140 can de-exponentiate the user IDs associated with the third party system 140. Specifically, the third party system 140 may remove the exponent T' but leave the exponent S. The result may be $v_j^S$ and can be determined by removing the exponent T' from the tuples $u_i^R$, $v_{j,k}^{T'S}$ received in step 220. The process 300 can proceed with performing the steps 224-228 by the first party system 120 as described with reference to process 200. Note though that the first party system 120 can recover $v_j$ for exactly the IDs that matched and will recover a random point for all IDs that did not match.

Figure 4A:
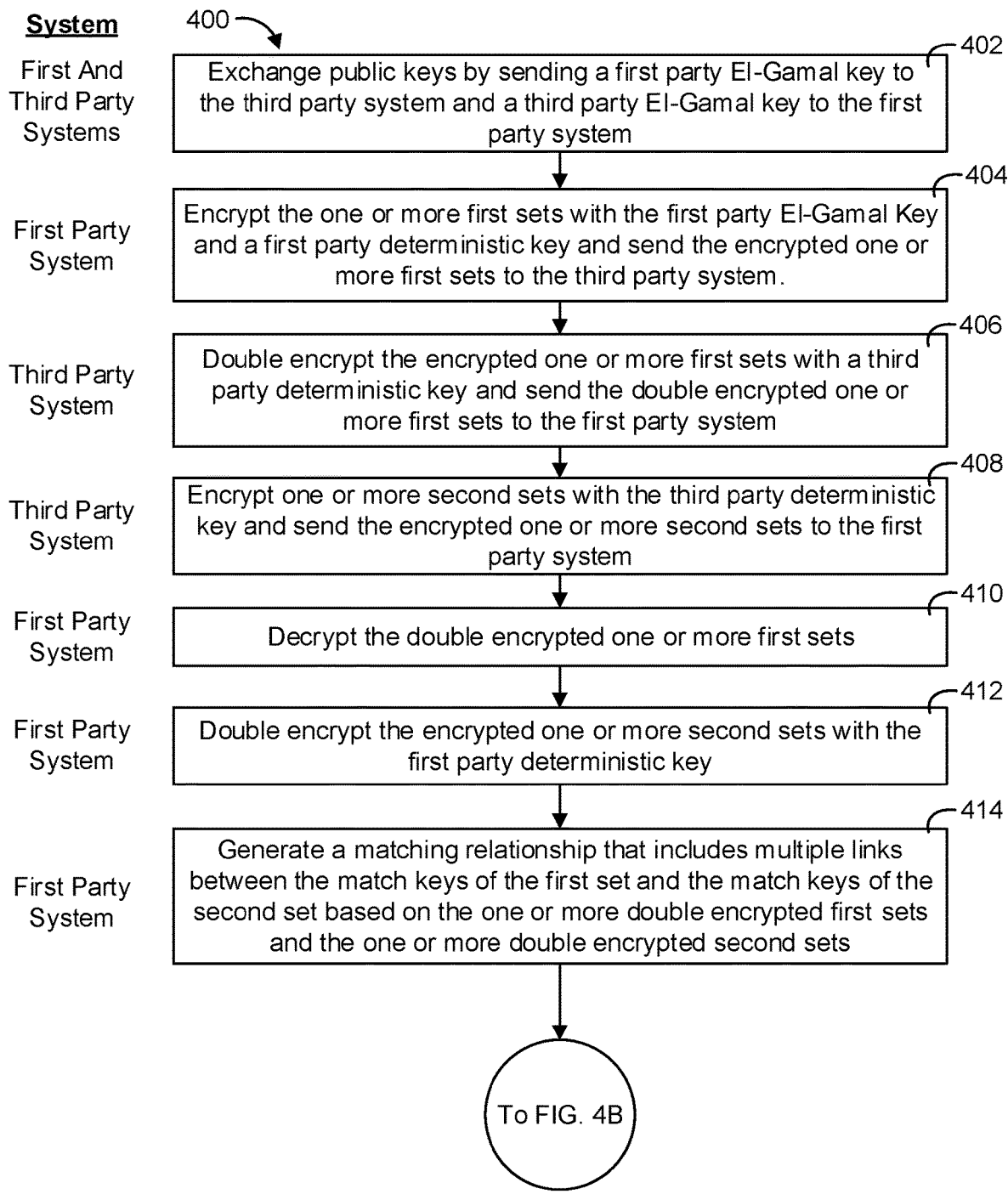
FIGS. 4A and 4B are flowcharts of a process for using encrypted bridge identifiers for establishing a link between user identifiers of the first party system and the third party system, according to an illustrative implementation.
Figure 4B:
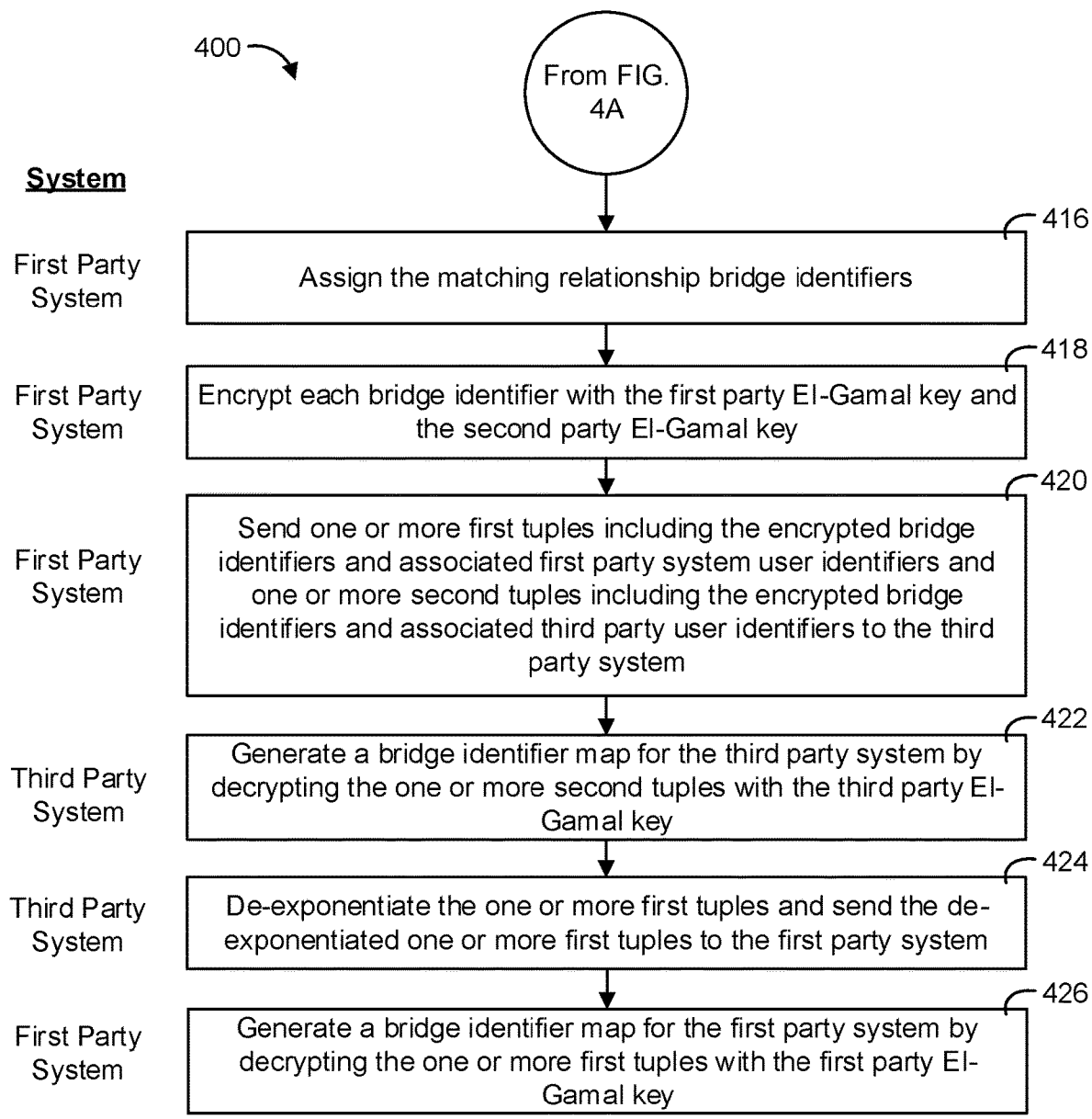

Referring now to FIGS. 4A-4B, a process 400 is shown for establishing a link between user IDs of the first party system 120 and the third party system 140 where bridge IDs are encrypted, according to an illustrative implementation. In some implementations, instead of learning BIDs, both the first party system 120 and the third party system 140 learn encrypted BIDs. The encrypted BIDs can be decrypted in an online fashion using a separate protocol, before they can be checked for quality. The first party system 120 and the third party system 140 can be configured to perform the steps of process 400. Furthermore, any one or combination of computing devices described herein can be configured to perform the process 400.

Figure 4C:
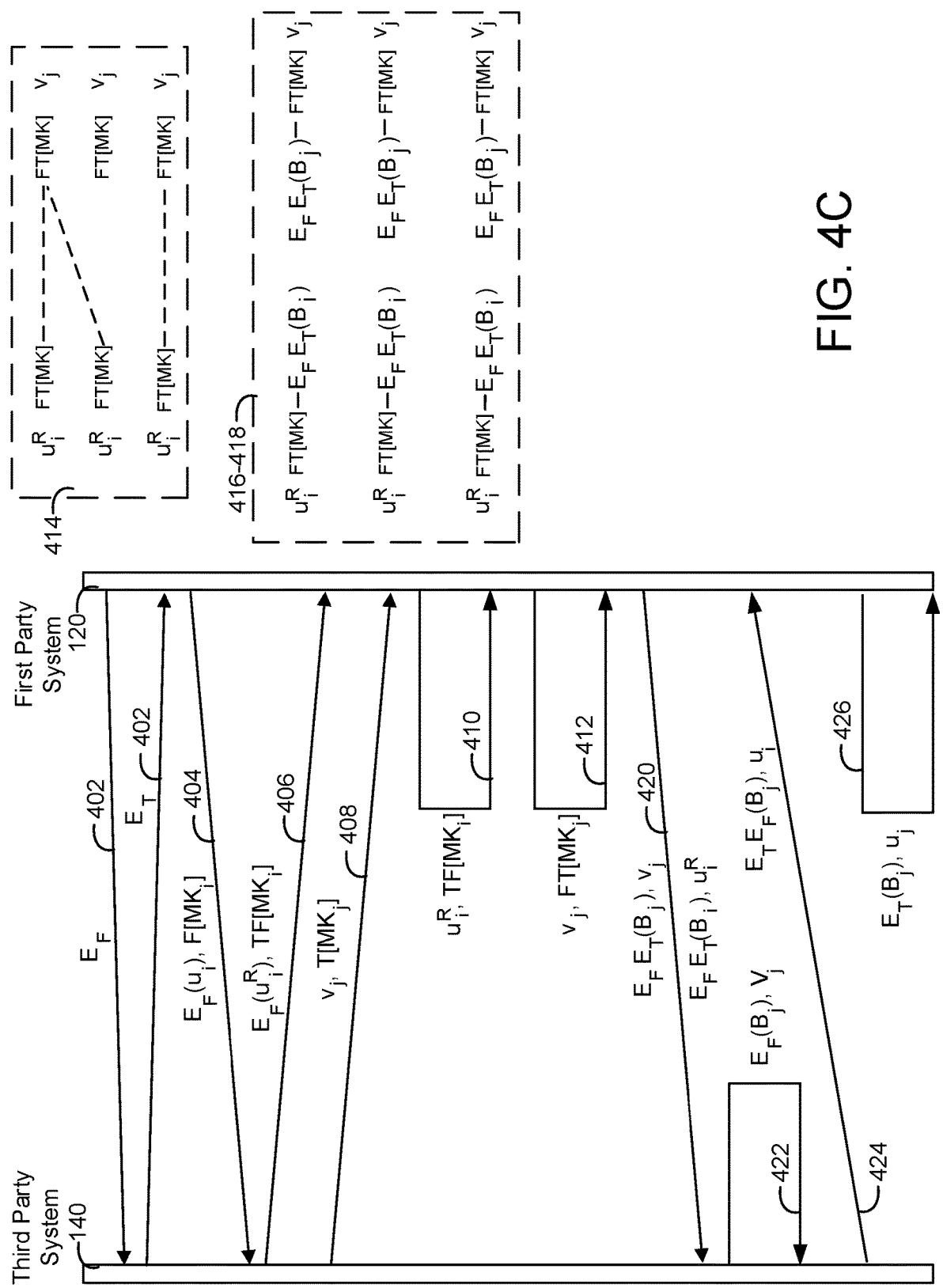
FIG. 4C is a transmission diagram for the process of FIGS. 4A and 4B, according to an illustrative implementation.

Referring to FIG. 4C, a transmission diagram if shown illustrating the process 400 in greater detail. The transmission diagram of FIG. 4C illustrates the data transmitted between the first party system 120 and the third party system 140 in addition to illustrating the matching relationship generating step 414 and the BID assignment steps 416-420.

Pruning links in order to prevent leaking additional linkages between user IDs, such as performed in step 212 of the process 200, can lead to inaccuracy. Referring generally to the process 400, the process 400 can avoid this pruning step and may thus give better quality matching. In some implementations, instead of learning bridge IDs in the clear at the end of the process 400, the first party system 120 and the third party system 140 will instead learn randomized encryptions of the bridge IDs under the El-Gamal encryption key of the other system. Because the bridge IDs are encrypted, both parties will not learn additional links between the user IDs of their respective users.

In some implementations, beyond learning the bridge IDs associated with their own user IDs, each of the first party system 120 and the third party system 140 may learn nothing about the data set of the other system. In particular, no participants may learn new linkages between their user IDs. For example, the first party may not learn that the third party believes that user ID A and user ID B associated with the third party system 140 are the same user, and similarly, the first party system 120 may not learn that the first party thinks user ID C and user ID D associated with the third associated with the third party system 140 are the same user. In some implementations, such a process may allow the first party system 120 and the third party system 140 to learn some aggregate statistics about the two datasets.

Referring more particularly to FIGS. 4A-4B, in step 402, the first and third party systems 120 and 140 can exchange public El-Gamal keys. The public El-Gamal keys may be El-Gamal keys that each of the first party system 120 and the third party system 140 are configured to store, generate, and/or receive. Specifically, the first party system 120 can send the third party system 140 a first party El-Gamal key, $E_F$, and the third party system 140 can send the first party system 120 a third party El-Gamal key, $E_T$.

In step 404, the first party system 120 can encrypt the one or more first data sets 126 with the first party El Gamal key and a first party deterministic key and send the encrypted the first data sets 126 to the third party system 140. Specifically, the first party system 120 can encrypt the $u_i$ with the first party key $E_F$ to generate $E_F(u_i)$ and $MK_i$ with the first party deterministic key, F, to generate $F(MK_i)$. The encrypted one or more first data sets 126 may be in the form of tuples $E_F(u_i)$, $F(MK_i)$. The first party system 120 can send the encrypted first data sets 126, $E_F(u_i),F(MK_i)$, to the third party system 140. Since $u_i$ is encrypted using El-Gamal, even if multiple tuples share the same $u_i$, they will have different encryptions.

In step 406, the third party system 140 can double-encrypt the encrypted first data sets 126 with a third party deterministic key, T. The third party system 140 can then randomize the double encrypted first data sets 126. The result of the double encryption may be $(E_F(u_i^R),TF[MK_i])$ where the third party system 140 may encrypt all the $u_i$ using the same R. The result can be sent to the first party system 120 in a shuffled order.

In step 408, the third party system 140 can encrypt the one or more second data sets 146 with a deterministic third party key and send the one or more encrypted second data sets 146 to the first party system 120. Specifically, the one or more second data sets 146, $(v_j, MK_j)$ by encrypting the $MK_j$ values with the third party key, T. The result may be $(v_j, T(MK_j))$ which can be sent by the third party system 140 to the first party system 120.

In step 410, the first party system 120 can decrypt the double encrypted the first data sets 126. The first party system 120 can decrypt the double encrypted one or more first data sets 126, i.e., $(E_F(u_i^R), TF[MK_i])$ by removing the first party El-Gamal encryption $E_F$. The result may be tuples in the form of $(u_i^R, TF[MK_i])$.

In step 412, the first party system 120 can double encrypt the one or more encrypted second data sets 146 received from the third party system 140 in step 408 with a first party deterministic key. Specifically, the one or more encrypted second data sets 146 received in step 408 may be $(v_j, T(MK_j))$. For each tuple, first party system 120 can double encrypt $T(MK_j)$ with the first party key F. The result may be tuples in the form $(v_j, FT(MK_j))$.

In step 414, the first party system 120 can generate a matching relationship including multiple links between the MK values of the double encrypted first data sets 126 and the MK values of the doubled encrypted second data sets 146. The vertices of the matching relationship may represent user IDs $u_i^R$ (blinded via encryption) and $v_j$ (in the clear, not encrypted), and an edge between two vertices represents a matching FT(MK). The first party system 120 can find the connected components in the joined/blinded matching relationship.

In step 416, the first party system 120 can assign encrypted bridge IDs with the first party El-Gamal key and the third party El Gamal key. For each connected component (e.g., each matched or unmatched user ID vertice), the first party system 120 can select a random bridge ID $B_j$ to use for that component and encrypt the bridge ID values under both the first party El-Gamal key and the third party El-Gamal key.

This encryption of bridge IDs may be a separate randomized encryption for each vertex in the matching relationship, with the same plaintext being encrypted. In step 418, the first party system 120 can encrypt the assigned bridge identifiers with the first party El-Gamal key and the third party El-Gamal key. After the encryption of step 418, each $u_i^R$ will be associated with a single $E_F E_T(B_j)$, and each $v_j$ with a single $E_F E_T(B_j)$. This is where the deduplication occurs; because each $v_j$ is only associated with a single encrypted bridge ID corresponding to its component, the third party system 140 will not see duplicates at all.

In step 420, the first party system 120 can shuffle and send the third party system 140 one or more first tuples including the encrypted bridge identifiers generated in step 420 and user IDs associated with the first party system and one or more second tuples including the encrypted bridge identifiers and user IDS associated with the third party system. The tuples may associate user IDs of the first and third party systems 120 and 140 with the double encrypted bridge IDs. The tuples may be $(E_F E_T(B_j),v_j)$ (the first tuples) and $(E_F E_T(B_j),u_i^R)$ (the second tuples) i.e., the vertices of the connected components together with their double-encrypted bridge IDs.

In step 422, the third party system 140 can generate the bridge identifier map 144 for the third party system 140 by decrypting the one or more second tuples with the third party El-Gamal key. For the one or more second tuples, $(E_F E_T(B_j),v_j)$, the third party system 140 can decrypt the bridge IDs with the third party El-Gamal encryption key, $E_T$, to generate an encrypted bridge ID map, $(E_F(B_j), v_j)$.

In step 424, the third party system 140 can de-exponentiate the one or more first tuples and send the de-exponentiated one or more first tuples to the first party system 120. The one or more first tuple of the form $(E_F E_T(B_i), u_i^R)$ can be de-exponentiated by the third party system 140 by removing the exponent R. The third party system 140 can re-randomize the encryption in the first position, removes the power of R in the exponent of $u_i$ in the second position which results in $(E_T E_F(B_j), u_i)$. The third party system 140 can shuffle the result and/or send the result to the first party system 120.

In step 426, the first party system 120 can generate the bridge identifier map 126 for the first party system 120 by decrypting the one or more first tuple with the first party El-Gamal key. For each tuple $(E_T E_F(B_i), u_i)$, the first party system 120 decrypts the first component with the El-Gamal key of the first party system, $E_T$, to get the encrypted BID map for the first party system 120, $(E_F(B_j), u_i)$.

Figure 5A:
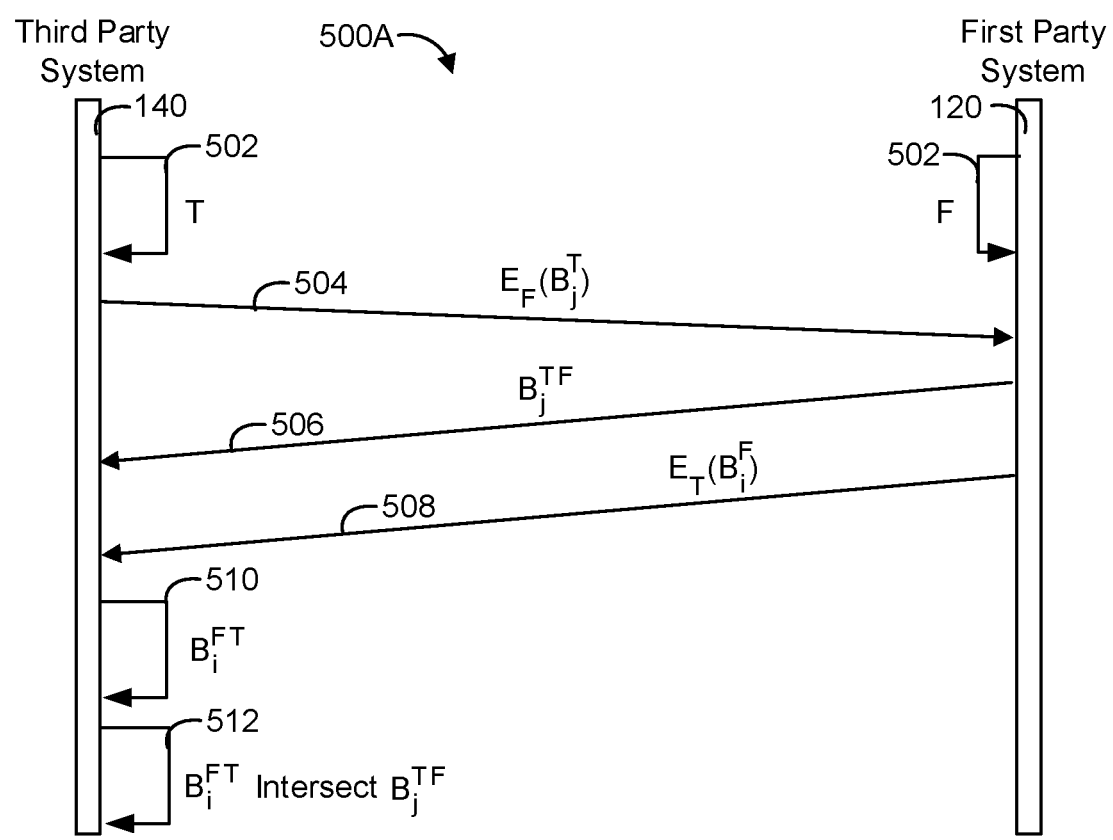
FIG. 5A is flow diagram a process for performing a secure intersection method where the third party system determines an intersection of bridge identifiers generated by the process of FIGS. A-C, according to an illustrative implementation.

Referring now to FIG. 5A, transmission diagram of a process 500A, a secure intersection process for determining the intersection of encrypted bridge identifiers by the third party system 140 is shown, according to an illustrative implementation. Process 500A can be used to determine the intersection of the encrypted bridge identifier generated in process 400 by the third party system 140. The first party system 120 and the third party system 140 can be configured to perform the steps of the process 500A. Furthermore, any one or combination of computing devices described herein can be configured to perform the process 500A.

In broad overview of the process 500A, the third party system 140 can first exponentiate its encrypted bridge identifiers homomorphically and send them to the first party system 120. The first party system 120 can then decrypt, double-exponentiate, shuffle, and send them back to the third party system 140. The first party system 120 can then exponentiate its own encrypted bridge IDs and send these ciphertexts to the third party system 140. The third party system 140 can then decrypt the bridge IDs of the first party system 120 and double exponentiate them. The third party system 140 then has double-encrypted BIDs for each party, and can perform intersections as before (roles can be swapped to change from forward to reverse, in some implementations).

In step 502, the first party system 120 can generate a first party deterministic encryption key, F, while the third party system 140 can generate a third party deterministic encryption key, T.

In step 504, for each user $v_j$ in the segment, the third party system 140 can homomorphically exponentiate the associated El-Gamal encrypted Bridge ID generating the result $E_F(B_j^T)$, which can be sent to the first party system 120. In step 506, the first party system 120 can decrypt and double exponentiate $E_F(B_j^T)$ to generate $B_j^{TF}$ and send $B_j^{TF}$ to the third party system. More specifically, the first party system 120 can decrypt each $E_F(B_i^T)$, removing $E_F$ and double exponentiate with F to generate the result $B_j^{TF}$. The order of the values can be shuffled before being sent. In step 508, the first party system 120, for each $u_i$ in the segment, first party homomorphically exponentiates the associated El-Gamal encrypted bridge ID sending $E_T(B_i^F)$ to the third party system.

In step 510, the third party system 140 can decrypt each $E_T(B_i^F)$ and double exponentiate the result to generate $B_i^{FT}$. In step 512, the third party system 140 can determine the intersection size by intersecting the double exponentiated bridge identifiers. More specifically, the third party system 140 can intersect the $B_i^{FT}$ values with the received $B_j^{TF}$ values, and learn the intersection size. The protocol above can be naturally extended to learn intersection sum, and can also be reversed so that the other party performs the intersection. A secure intersection-sum process is described in greater detail in FIG. 5B.

Figure 5B:
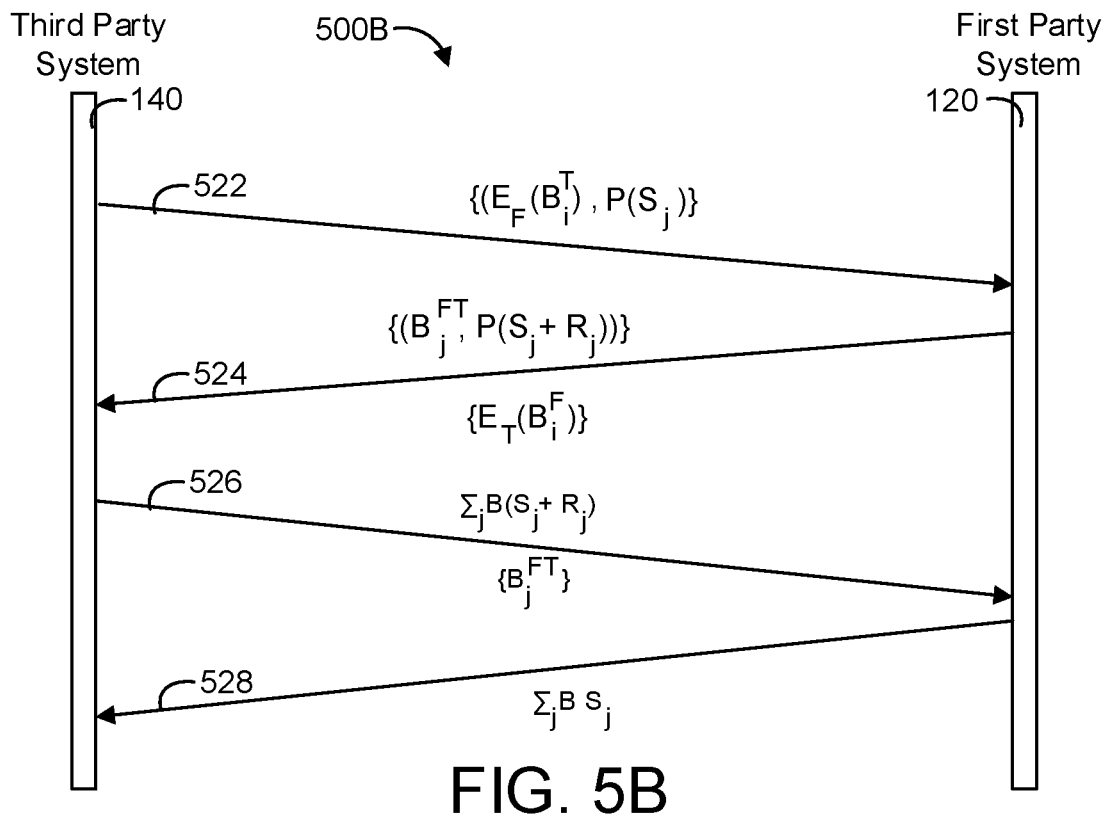
FIG. 5B is a transmission diagram of a process for performing a secure intersection-sum method where the first party system determines the intersection of bridge identifiers generated by the process of FIGS. A-C, according to an illustrative implementation.

Referring now to FIG. 5B, a transmission diagram of a process 500B, a secure intersection-sum process for determining the intersection of encrypted bridge identifiers by the first party system 120 is shown, according to an illustrative implementation. Process 500B can be used to determine the intersection of the encrypted bridge identifier generated in process 400 by the first party system 120. The first party system 120 and the third party system 140 can be configured to perform the steps of process 500B. Furthermore, any one or combination of computing devices described herein can be configured to perform the process 500B.

In some implementations, the party performing the intersection gets to see the $B_i^{FT}$ and $B_j^{FT}$ values, and in particular, can see how many such values were repeated. This leaks exactly how many users (belonging to either party) in the segment were in the same connected component, but not which specific users.

The third party (not performing the intersection) gets to see the $B_i^T$ values for the first party, and in particular, can see how many such values were repeated. This leaks exactly how many of the first party's users in the segment were in the same connected component, but not which specific users.

In step 522, the third party system 140 sends $\{(E_F(B_j^T), P(S_j)\}$. In step 524, the first party system 120 sends $\{(B_j^{FT}, P(S_j+R_j))\}$ and $\{E_T(B_i^F)\}$ to the third party system 140. In step 526, the third party system 140 sends $\Sigma_j B(S_j+R_j)$ and $\{B_j^{FT}\}$. In step 528, the third party system 140 sends $\Sigma_j BS_j$.

Figure 5C:
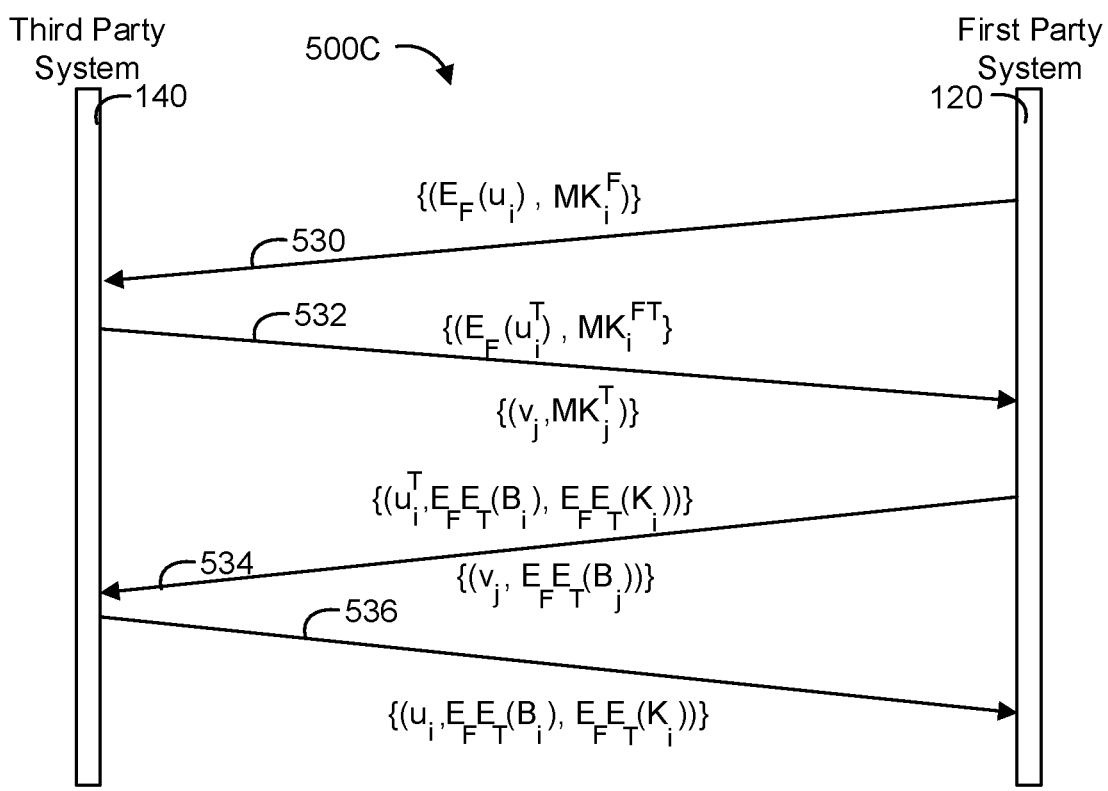
FIG. 5C is a transmission diagram of a process for determining a number of matched bridge IDs with indicator bits, according to an illustrative implementation.

Referring now to FIG. 5C, transmission diagram of a process 500C for determining a number of matched bridge IDs with indicator bits, according to an implementation. The first party system 120 and the third party system 140 can be configured to perform the steps of process 500C. Furthermore, any one or combination of computing devices described herein can be configured to perform the process 500C.

In step 530, the first party system 120 sends the third party system 140 $\{(E_F(u_i), MK_j^F)\}$. In step 532, the third party system replies by sending the first party system with $\{(E_F(u_i), MK_i^{FT})\}$ and $\{(v_j, MK_j^T)\}$.

In step 534, the first party system 120 determines connected components and assigns bridge IDs to each component. For each first party vertex that is in a "singleton" component i.e., which has no edge with any other vertex, first party assigns $E_F E_T(e)$ to that vertex, and for vertices with non-zero degree assigns $E_F E_T(g)$ to the vertex, where e is the identity element of the EC group and g is a generator. The first party system 120 can then send $\{(u_i^T, E_F E_T(B_i), E_F E_T(K_i)\}$ and $\{v_j, E_F E_T(B_j)\}$ to the third party system 140.

In step 536, the third party system 140 replies to the third party system with $\{u_i, E_F E_T(B_i), E_F E_T(K_i)\}$. During the method, the first party system 120 should include $E_F E_T(K_i)$ with its segment bridge IDs. To determine how many elements in the segment had corresponding bridge IDs on the third party system 140 side. The third party system 140 can determine $\Pi_i SE_F(K_i) = EG(\Pi_i SK_i)$ i.e., it can use the El-Gamal homomorphism. Each $K_i$ is either e or g, so $K_i = g^\Sigma$, i.e., the exponent is the count of matched bridge IDs. It is hard to compute the exponent generally, but the segment sizes are not significantly large (millions at the most) meaning that the lower bound on the exponent is small. The first party can keep a lookup table of the possible exponents to decode this number. Note that this can also be done just for the intersection if necessary.

Figure 6:
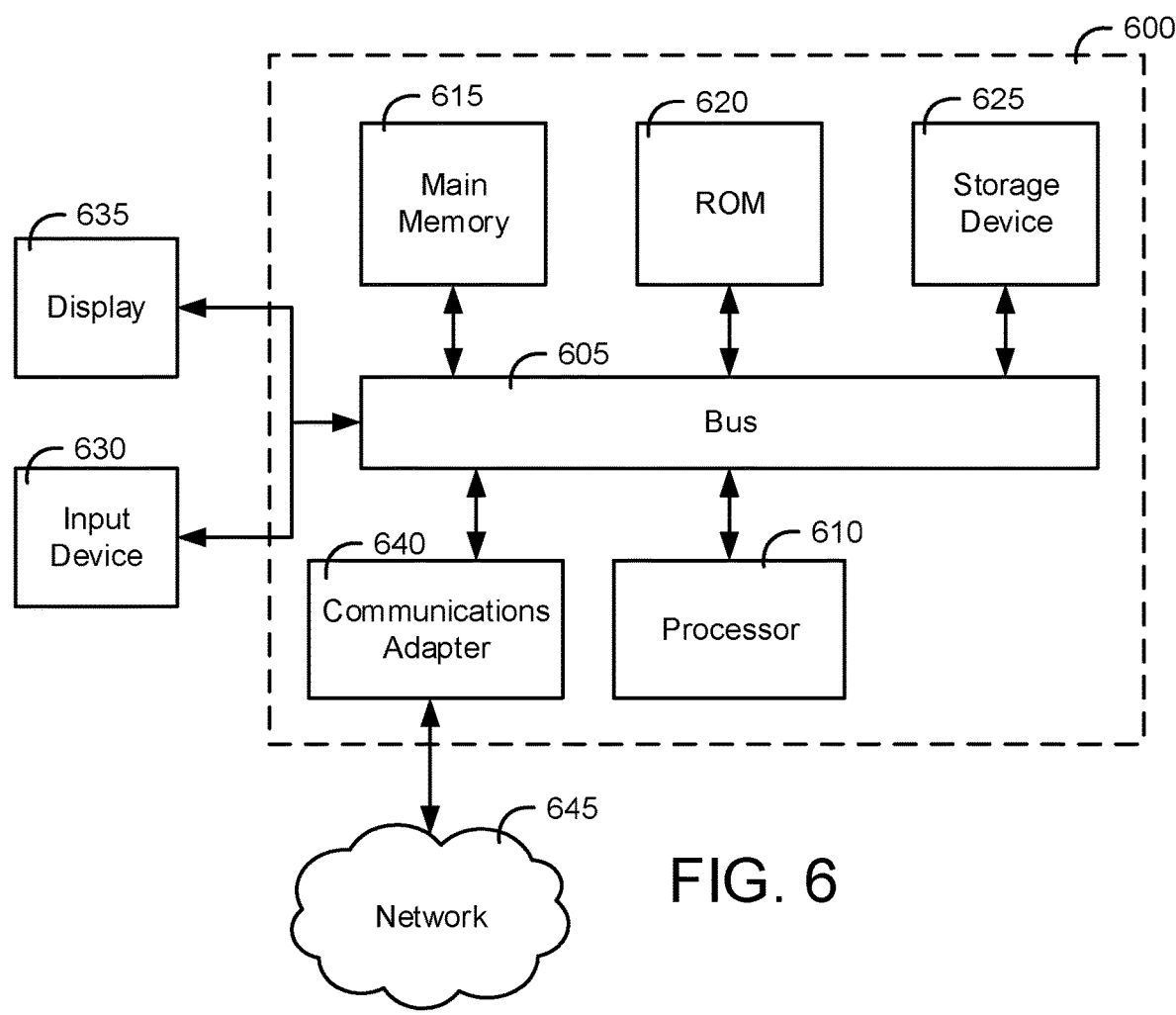
FIG. 6 is a block diagram of a computing system, according to an illustrative implementation.

Referring now to FIG. 6, FIG. 6 illustrates a depiction of a computer system 600 that can be used, for example, to implement an illustrative user device 104, an illustrative content management system 108, an illustrative content provider device 106, an illustrative first party system 120, an illustrative third party system 140, and/or various other illustrative systems described in the present disclosure. The computing system 600 includes a bus 605 or other communication component for communicating information and a processor 610 coupled to the bus 605 for processing information. The computing system 600 also includes main memory 615, such as a random access memory (RAM) or other dynamic storage device, coupled to the bus 605 for storing information, and instructions to be executed by the processor 610. Main memory 615 can also be used for storing position information, temporary variables, or other intermediate information during execution of instructions by the processor 610. The computing system 600 may further include a read only memory (ROM) 620 or other static storage device coupled to the bus 605 for storing static information and instructions for the processor 610. A storage device 625, such as a solid state device, magnetic disk or optical disk, is coupled to the bus 605 for persistently storing information and instructions.

The computing system 600 may be coupled via the bus 605 to a display 635, such as a liquid crystal display, or active matrix display, for displaying information to a user. An input device 630, such as a keyboard including alphanumeric and other keys, may be coupled to the bus 605 for communicating information, and command selections to the processor 610. In another implementation, the input device 630 has a touch screen display 635. The input device 630 can include a cursor control, such as a mouse, a trackball, or cursor direction keys, for communicating direction information and command selections to the processor 610 and for controlling cursor movement on the display 635.

In some implementations, the computing system 600 may include a communications adapter 640, such as a networking adapter. Communications adapter 640 may be coupled to bus 605 and may be configured to enable communications with a computing or communications network 645 and/or other computing systems. In various illustrative implementations, any type of networking configuration may be achieved using communications adapter 640, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to implement illustrative implementations. Thus, implementations are not limited to any specific combination of hardware circuitry and software.

Although an example processing system has been described in FIG. 6, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them Implementations of the subject matter described in this specification can be implemented as one or more computer programs, i.e., one or more subsystems of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing apparatus" or "computing device" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system A program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels," etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for establishing a link between user identifiers of different systems without disclosing specific user identifying information, the method comprising:
   retrieving, by a first party system and from a third party system, copies of one or more first data sets that were re-encrypted by the third party system and one or more second data sets that were encrypted by the third party system, the one or more first data sets each comprising a first match key and a first user identifier associated with the first party system and the one or more second data sets each comprising a second match key and a second user identifier associated with the third party system;
   generating, by the first party system, one or more re-encrypted second data sets by encrypting the one or more encrypted second data sets; and
   assigning, by the first party system and based on matching relationships between first and second match keys of the one or more re-encrypted first data sets and the one or more re-encrypted second data sets, bridge identifiers for first user identifiers associated with the first party system and second user identifiers associated with the third party system, the matching relationships indicating links between the first and second match keys and the bridge identifiers linking the first user identifiers and second user identifiers.

2. The method of claim 1, wherein each second user identifier of the one or more encrypted second data sets is exponentiated with a third party deterministic exponent.

3. The method of claim 1, further comprising:
   pruning, by the first party system, the matching relationships by removing links from the matching relationships so that:
   each second match key associated with the third party system has one link to the first match keys associated with the first party system; and
   each first match key associated with the first party system has one link to the second match keys associated with the third party system.

4. The method of claim 1, further comprising:
   pruning, by the first party system, the matching relationships by removing one or more of the links between the first and second match keys by determining second match keys associated with the third party system that have more than one link,
   wherein removing the links of the matching relationships causes some of the first and second user identifiers associated with the first and third party systems to be matched and some of the first and second user identifiers associated with the first and third party systems to be unmatched; and
   wherein assigning, by the first party system, bridge identifiers for the first user identifiers associated with the first party system and the second user identifiers associated with the third party system based on the matching relationships between the first and second match keys of the one or more re-encrypted first data sets and the one or more re-encrypted second data sets comprises assigning both the matched and the unmatched first user identifiers associated with the first party system and second user identifiers associated with the third party system the bridge identifiers.

5. The method of claim 1, further comprising:
   exponentiating, by the first party system, one or more first tuples with a first exponent, each first tuple linking the first user identifiers associated with the first party system to the bridge identifiers;
   sending, by the first party system to the third party system, the one or more exponentiated first tuples;
   sending, by the first party system to the third party system, one or more second tuples, each second tuple linking one of the second user identifiers associated with the third party system to one of the bridge identifiers, receipt, by the third party system, of the one or more exponentiated first tuples and the one or more second tuples causing the third party system to:
      generate a bridge identifier map by exponentiating the bridge identifiers of the one or more second tuples with a second exponent;
      re-exponentiate the one or more exponentiated first tuples with the second exponent; and
      send, to the first party system, the one or more re-exponentiated first tuples; and
   generating, by the first party system, a bridge identifier map for the first party system by removing the first exponent from the one or more re-exponentiated first tuples.

6. The method of claim 1, further comprising:
   encrypting, by the first party system, the one or more first data sets by:
      encrypting the first user identifiers associated with the first party system with an El-Gamal key; and
      encrypting the first match keys associated with the first party system with a first party deterministic key; and
   transmitting, by the first party system, the one or more encrypted first data sets to the third party system, receipt of the one or more encrypted first data sets causing the third party system to generate the one or more re-encrypted first data sets by encrypting the one or more encrypted first data sets by:
    encrypting the encrypted first match keys associated with the first party system with a third party deterministic encryption key; and
    raising the encrypted first user identifiers encrypted with the El-Gamal key to an exponent.

7. The method of claim 1, further comprising:
sending, by the first party system to the third party system, a first party El-Gamal key, wherein the first party El-Gamal key is a public key of the first party system; and
receiving, by the first party system from the third party system, a third party El-Gamal key, wherein the third party El-Gamal key is a public key of the third party system; and
encrypting, by the first party system, the one or more first data sets by encrypting the one or more first data sets with the first party El-Gamal key and a first party deterministic key;
transmitting, by the first party system, the one or more encrypted first data sets to the third party system, receipt of the one or more encrypted first data sets causing the third party system to:
    encrypt the one or more encrypted first data sets with a third party deterministic key to generate the one or more re-encrypted first data sets; and
    encrypt the one or more encrypted second data sets by encrypting the second match keys associated with the third party system with the third party deterministic key.

8. The method of claim 7, further comprising:
encrypting, by the first party system, each of the assigned bridge identifiers with the first party El-Gamal key and the third party El-Gamal key;
sending, by the first party system to the third party system, one or more first tuples including the encrypted bridge identifiers and associated first user identifiers associated with the first party system; and
sending, by the first party system to the third party system, one or more second tuples comprising the encrypted bridge identifiers and associated second user identifiers associated with the third party system.

9. The method of claim 8, wherein receipt, from the first party system, of the one or more first tuples and the one or more second tuples causes the third party system to:
generate a bridge identifier map for the third party system by decrypting the one or more second tuples with the third party El-Gamal key;
de-exponentiate the one or more first tuples; and
send the de-exponentiated one or more first tuples to the first party system;
the method further comprising:
generating, by the first party system, a bridge identifier map for the first party system by decrypting the one or more first tuples with the first party El-Gamal key.

10. A first party system for establishing a link between user identifiers of different systems without disclosing specific user identifying information, the first party system comprising:
a processing circuit operably coupled to a memory and configured to:
retrieve, from a third party system, copies of one or more first data sets that were re-encrypted by the third party system and one or more second data sets that were encrypted by the third party system, the one or more first data sets each comprising a first match key and a first user identifier associated with the first party system and the one or more second data sets each comprising a second match key and a second user identifier associated with the third party system;
generate one or more re-encrypted second data sets by encrypting the one or more encrypted second data sets; and
assign, based on matching relationships between first and second match keys of the one or more re-encrypted first data sets and the one or more re-encrypted second data sets, bridge identifiers for first user identifiers associated with the first party system and second user identifiers associated with the third party system, the matching relationships indicating links between the first and second match keys and the bridge identifiers linking the first user identifiers and second user identifiers.

11. The system of claim 10, wherein the processing circuit is configured to prune the matching relationships by removing links from the matching relationships so that:
each second match key associated with the third party system has one link to the first match keys associated with the first party system; and
each first match key associated with the first party system has one link to the second match keys associated with the third party system.

12. The system of claim 10, wherein the processing circuit is configured to prune the matching relationships by removing one or more of the links between the first and second match keys by determining second match keys associated with the third party system that have more than one link.

13. The system of claim 10, wherein the processing circuit is configured to:
exponentiate one or more first tuples with a first exponent, each first tuple linking the first user identifiers associated with the first party system to the bridge identifiers;
send, to the third party system, the one or more exponentiated first tuples; and
send, to the third party system, one or more second tuples, each second tuple linking one of the second user identifiers associated with the third party system to one of the bridge identifiers, receipt of the one or more exponentiated first tuples and the one or more second tuples causing the third party system to:
    generate a bridge identifier map by exponentiating of the one or more second tuples with a second exponent;
    re-exponentiate the one or more exponentiated first tuples with the second exponent; and
    send the re-exponentiated first tuples to the processing circuit;
receive, from the third party system, the one or more re-exponentiated first tuples; and
generate a bridge identifier map for the first party system by removing the first exponent from the one or more exponentiated first tuples.

14. A method for establishing a link between user identifiers of different systems without disclosing specific user identifying information, the method comprising:
retrieving, by a first party processing circuit and from a third party processing circuit, copies of one or more first data sets that were re-encrypted by the third party processing circuit and one or more second data sets that were encrypted by the third party processing circuit, the one or more first data sets each comprising a first match key and a first user identifier associated with the first party processing circuit and the one or more second data sets each comprising a second match key and a second user identifier associated with the third party processing circuit;

generating, by the first party processing circuit, one or more re-encrypted second data sets by encrypting the one or more encrypted second data sets;

assigning, by the first party processing circuit and based on matching relationships between first and second match keys of the one or more re-encrypted first data sets and the one or more re-encrypted second data sets, bridge identifiers for first user identifiers associated with the first party processing circuit and second user identifiers associated with the third party processing circuit, the matching relationships indicating links between the first and second match keys and the bridge identifiers linking the first user identifiers and second user identifiers; and pruning, by the first party processing circuit, the matching relationships by removing one or more of the links between the first and second match keys by determining first match keys associated with the first party processing circuit or second match keys associated with the third party processing circuit that have more than one link.

15. The method of claim 14, wherein each second user identifier of the one or more encrypted second data sets is exponentiated with a third party deterministic exponent.

16. The method of claim 14, wherein pruning, by the first party processing circuit, the matching relationships comprises removing links from the matching relationships so that:

each second match key associated with the third party processing circuit has one link to the first match keys associated with the first party processing circuit; and each first match key associated with the first party processing circuit has one link to the second match keys associated with the third party processing circuit.

17. The method of claim 14, further comprising:

exponentiating, by the first party processing circuit, one or more first tuples with a first exponent, each first tuple linking the first user identifiers associated with the first party processing circuit to the bridge identifiers;

sending, by the first party processing circuit to the third party processing circuit, the one or more exponentiated first tuples;

sending, by the first party processing circuit to the third party processing circuit, one or more second tuples, each second tuple linking one of the second user identifiers associated with the third party processing circuit to one of the bridge identifiers, receipt, by the third party processing circuit, of the one or more exponentiated first tuples and the one or more second tuples causing the third party processing circuit to:

generate a bridge identifier map by exponentiating the bridge identifiers of the one or more second tuples with a second exponent;

re-exponentiate the one or more exponentiated first tuples with the second exponent; and send, to the first party processing circuit, the one or more re-exponentiated first tuples; and generating, by the first party processing circuit, a bridge identifier map for the first party processing circuit by removing the first exponent from the one or more re-exponentiated first tuples.

18. The method of claim 14, wherein encrypting, by the first party processing circuit, the one or more first data sets comprises:

encrypting the first user identifiers associated with the first party processing circuit with an El-Gamal key; and encrypting the first match keys associated with the first party processing circuit with a first party deterministic key;

the method further comprising:

sending, by the first party processing circuit to the third party processing circuit, the one or more encrypted first data sets, receipt of the one or more encrypted first data sets causing the third party processing circuit to encrypt the one or more first data sets to generate the one or more re-encrypted first data sets by:

encrypting the encrypted first match keys associated with the first party processing circuit with a third party deterministic encryption key; and raising the encrypted first user identifiers encrypted with the El-Gamal key to an exponent.

19. The method of claim 14, wherein the one or more encrypted second data sets comprise second match keys associated with the third party processing circuit each encrypted with a third party deterministic key, the method further comprising:

sending, by the first party processing circuit to the third party processing circuit, a first party El-Gamal key, wherein the first party El-Gamal key is a public key of the first party processing circuit; and receiving, by the first party processing circuit from the third party processing circuit, a third party El-Gamal key, wherein the third party El-Gamal key is a public key of the third party processing circuit, wherein encrypting, by the first party processing circuit, the one or more first data sets comprises encrypting, by the first party processing circuit, the one or more first data sets with the first party El-Gamal key and a first party deterministic key;

transmitting, by the first party processing circuit to the third party processing circuit, the one or more encrypted first data sets, causing the third party processing circuit to encrypt the one or more encrypted first data sets with a third party deterministic key to generate the one or more re-encrypted first data sets;

encrypting, by the first party processing circuit, each of the assigned bridge identifiers with the first party El-Gamal key and the third party El-Gamal key;

sending, by the first party processing circuit to the third party processing circuit, one or more first tuples including the encrypted bridge identifiers and associated first user identifiers associated with the first party processing circuit; and sending, by the first party processing circuit to the third party processing circuit, one or more second tuples comprising the encrypted bridge identifiers and associated second user identifiers associated with the third party processing circuit.

20. The method of claim 19, wherein receipt, by the third party processing circuit, of the one or more first tuples and the one or more second tuples causes the third party processing circuit to:

generate a bridge identifier map for the third party processing circuit by decrypting the one or more second tuples with the third party El-Gamal key; and de-exponentiate the one or more first tuples and send the de-exponentiated one or more first tuples to the first party processing circuit;

the method further comprising:
generating, by the first party processing circuit, a bridge identifier map for the first party processing circuit by decrypting the one or more first tuples with the first party El-Gamal key.

* * * * *